US012545939B2

(12) United States Patent
Kim et al.

(10) Patent No.: US 12,545,939 B2
(45) Date of Patent: Feb. 10, 2026

(54) L-TYROSINE-EXPORTING PROTEIN VARIANT AND METHOD FOR PRODUCING L-TYROSINE USING THE SAME

(71) Applicant: CJ CHEILJEDANG CORPORATION, Seoul (KR)

(72) Inventors: Hyun Ah Kim, Seoul (KR); Heejung Kim, Seoul (KR); Moo Young Jung, Seoul (KR); Chang Il Seo, Seoul (KR); Gyuhyeon Song, Seoul (KR)

(73) Assignee: CJ CHEILJEDANG CORPORATION, Seoul (KR)

(*) Notice: Subject to any disclaimer, the term of this patent is extended or adjusted under 35 U.S.C. 154(b) by 538 days.

(21) Appl. No.: 17/999,788

(22) PCT Filed: May 27, 2021

(86) PCT No.: PCT/KR2021/006621
§ 371 (c)(1),
(2) Date: Nov. 23, 2022

(87) PCT Pub. No.: WO2021/242032
PCT Pub. Date: Dec. 2, 2021

(65) Prior Publication Data

US 2023/0272441 A1 Aug. 31, 2023

(30) Foreign Application Priority Data

May 27, 2020 (KR) ........................ 10-2020-0063778

(51) Int. Cl.
*C12P 13/22* (2006.01)
*C07K 14/34* (2006.01)
*C12N 15/77* (2006.01)

(52) U.S. Cl.
CPC ............ *C12P 13/225* (2013.01); *C07K 14/34* (2013.01); *C12N 15/77* (2013.01)

(58) Field of Classification Search
CPC ........ C12P 13/225; C12P 13/22; C12N 15/77; C12N 2510/00; C12R 2001/15; C07K 14/195
See application file for complete search history.

(56) References Cited

U.S. PATENT DOCUMENTS 6,858,406 B1 2/2005 Vrlijc et al.
2020/0063219 A1* 2/2020 Jung ...................... C12N 15/77

FOREIGN PATENT DOCUMENTS

| | | | | |
|---|---|---|---|---|
| EP | 0263515 A2 * | 4/1988 | | |
| EP | 1013765 A1 | 6/2000 | | |
| EP | 1016710 B1 | 3/2010 | | |
| EP | 3 789 398 A1 | 3/2021 | | |
| KR | 10-0620092 | 9/2006 | | |
| KR | 10-0791794 B1 | 1/2008 | | |
| KR | 10-0924065 | 10/2009 | | |
| KR | 10-2005-0044860 A | 3/2011 | | |
| KR | 10-1968317 B1 | 4/2019 | | |
| WO | WO 2019/164348 A1 | 8/2019 | | |
| WO | WO-2020204427 A1 * | 10/2020 | ........... | C07K 14/195 |

OTHER PUBLICATIONS

NCBI, Genbank accession No. WP_050478745.1 (Apr. 6, 2020).
Doroshenko et al., FEMS Microbiol Lett 275 (2007) 312-318.
Zhang et al., J Ind Microbiol Biotechnol. May 2015;42(5):787-97.
Lutke-Eversloh et al., Appl. Microbiol. Biotechnol. 75, 103-110 (2007).
Kikuchi et al., Appl. Environ. Microbiol. 63, 761-762 (1997).
Heery et al., Appl Environ Microbiol 59 791, 1993.
Flores et al., Nature Biotechnol 14 620, 1996.
Extended European Search Report received in European Patent Application No. 21813776.8, dated Oct. 4, 2023.

* cited by examiner

*Primary Examiner* — Sharmila G Landau
*Assistant Examiner* — Ashley T White
(74) *Attorney, Agent, or Firm* — Knobbe, Martens, Olson & Bear, LLP

(57) ABSTRACT

A protein variant having an L-tyrosine exporting activity, a microorganism expressing the same, and use thereof.

8 Claims, No Drawings

Specification includes a Sequence Listing.

SEQUENCE LISTING

```
<160> NUMBER OF SEQ ID NOS: 85

<210> SEQ ID NO 1
<211> LENGTH: 307
<212> TYPE: PRT
<213> ORGANISM: Artificial Sequence
<220> FEATURE:
<223> OTHER INFORMATION: Wex L79A

<400> SEQUENCE: 1

Met Asn Ser Lys Lys Ala Thr Leu Ile Gly Leu Thr Ala Val Val Leu
1               5                   10                  15

Trp Ser Ser Ile Val Gly Leu Ile Arg Gly Val Ser Glu His Leu Gly
            20                  25                  30

Ala Thr Gly Gly Ala Ala Met Met Tyr Ser Val Ala Ser Leu Phe Leu
        35                  40                  45

Leu Leu Ser Val Gly Phe Pro Lys Leu Gly Ser Phe Pro Lys Lys Tyr
    50                  55                  60

Leu Leu Trp Gly Ser Leu Leu Phe Val Ser Tyr Glu Leu Cys Ala Ser
65                  70                  75                  80

Leu Ser Ile Gly Tyr Ala Asn Thr Gly Arg Gln Ala Ile Glu Val Ser
                85                  90                  95

Met Val Asn Tyr Leu Trp Pro Ala Phe Thr Leu Ile Ala Ala Ile Ala
            100                 105                 110

Phe Asn Arg Gln Arg Ala Asn Trp Met Val Val Pro Gly Phe Ile Leu
        115                 120                 125

Ser Ile Ile Gly Ile Cys Trp Val Leu Gly Gly Asp Gln Gly Leu Asp
    130                 135                 140

Leu Ala Gly Met Leu Gly Asn Val Gln Asp Asn Pro Leu Ser Tyr Gly
```

```
145                 150                 155                 160

Leu Ala Phe Leu Gly Ala Val Ile Trp Ala Ala Tyr Cys Thr Val Thr
                165                 170                 175

Ala Arg Leu Ala Lys Gly Lys Asn Gly Val Thr Leu Phe Phe Ile Leu
            180                 185                 190

Val Ala Leu Thr Leu Trp Val Lys Phe Phe Phe Gly Asp His Arg Pro
        195                 200                 205

Met Ser Phe Ser Leu Pro Ala Ile Val Tyr Leu Leu Leu Ala Ala Ala
    210                 215                 220

Ala Met Gly Phe Gly Tyr Ala Ala Trp Asn Val Gly Ile Leu His Gly
225                 230                 235                 240

Asn Val Thr Val Leu Ala Gly Val Ser Tyr Phe Ile Pro Val Phe Ser
                245                 250                 255

Ala Ala Leu Ser Ala Met Val Leu His Ala Pro Leu Pro Arg Ser Phe
            260                 265                 270

Trp Val Gly Ala Ser Leu Val Cys Ala Gly Ser Ile Leu Cys Trp Leu
        275                 280                 285

Ala Thr Arg Ala Arg Arg Ala Ser Ala Ala Gln Glu Asp Ala Val Ala
    290                 295                 300

Asp Cys Leu
305


<210> SEQ ID NO 2
<211> LENGTH: 307
<212> TYPE: PRT
<213> ORGANISM: Artificial Sequence
<220> FEATURE:
<223> OTHER INFORMATION: Wex L79G

<400> SEQUENCE: 2

Met Asn Ser Lys Lys Ala Thr Leu Ile Gly Leu Thr Ala Val Val Leu
1               5                   10                  15

Trp Ser Ser Ile Val Gly Leu Ile Arg Gly Val Ser Glu His Leu Gly
            20                  25                  30

Ala Thr Gly Gly Ala Ala Met Met Tyr Ser Val Ala Ser Leu Phe Leu
        35                  40                  45

Leu Leu Ser Val Gly Phe Pro Lys Leu Gly Ser Phe Pro Lys Lys Tyr
    50                  55                  60

Leu Leu Trp Gly Ser Leu Leu Phe Val Ser Tyr Glu Leu Cys Gly Ser
65                  70                  75                  80

Leu Ser Ile Gly Tyr Ala Asn Thr Gly Arg Gln Ala Ile Glu Val Ser
                85                  90                  95

Met Val Asn Tyr Leu Trp Pro Ala Phe Thr Leu Ile Ala Ala Ile Ala
            100                 105                 110

Phe Asn Arg Gln Arg Ala Asn Trp Met Val Val Pro Gly Phe Ile Leu
        115                 120                 125

Ser Ile Ile Gly Ile Cys Trp Val Leu Gly Gly Asp Gln Gly Leu Asp
    130                 135                 140

Leu Ala Gly Met Leu Gly Asn Val Gln Asp Asn Pro Leu Ser Tyr Gly
145                 150                 155                 160

Leu Ala Phe Leu Gly Ala Val Ile Trp Ala Ala Tyr Cys Thr Val Thr
                165                 170                 175

Ala Arg Leu Ala Lys Gly Lys Asn Gly Val Thr Leu Phe Phe Ile Leu
            180                 185                 190

Val Ala Leu Thr Leu Trp Val Lys Phe Phe Phe Gly Asp His Arg Pro
```

```
        195                 200                 205

Met Ser Phe Ser Leu Pro Ala Ile Val Tyr Leu Leu Leu Ala Ala Ala
    210                 215                 220

Ala Met Gly Phe Gly Tyr Ala Ala Trp Asn Val Gly Ile Leu His Gly
225                 230                 235                 240

Asn Val Thr Val Leu Ala Gly Val Ser Tyr Phe Ile Pro Val Phe Ser
                245                 250                 255

Ala Ala Leu Ser Ala Met Val Leu His Ala Pro Leu Pro Arg Ser Phe
            260                 265                 270

Trp Val Gly Ala Ser Leu Val Cys Ala Gly Ser Ile Leu Cys Trp Leu
        275                 280                 285

Ala Thr Arg Ala Arg Arg Ala Ser Ala Ala Gln Glu Asp Ala Val Ala
    290                 295                 300

Asp Cys Leu
305


<210> SEQ ID NO 3
<211> LENGTH: 35
<212> TYPE: DNA
<213> ORGANISM: Artificial Sequence
<220> FEATURE:
<223> OTHER INFORMATION: primer

<400> SEQUENCE: 3

tcgagctcgg taccctggga acttgtcgac gctat                                35


<210> SEQ ID NO 4
<211> LENGTH: 35
<212> TYPE: DNA
<213> ORGANISM: Artificial Sequence
<220> FEATURE:
<223> OTHER INFORMATION: primer

<400> SEQUENCE: 4

tgttcggcaa gcattgtggt gtgggcaatg atcac                                35


<210> SEQ ID NO 5
<211> LENGTH: 35
<212> TYPE: DNA
<213> ORGANISM: Artificial Sequence
<220> FEATURE:
<223> OTHER INFORMATION: primer

<400> SEQUENCE: 5

attaacggtt aaagtactca ttgtgaggtg gcggg                                35


<210> SEQ ID NO 6
<211> LENGTH: 35
<212> TYPE: DNA
<213> ORGANISM: Artificial Sequence
<220> FEATURE:
<223> OTHER INFORMATION: primer

<400> SEQUENCE: 6

ctctagagga tccccggagc tgctgtccaa cgtgg                                35


<210> SEQ ID NO 7
<211> LENGTH: 35
<212> TYPE: DNA
<213> ORGANISM: Artificial Sequence
<220> FEATURE:
<223> OTHER INFORMATION: primer
```

<400> SEQUENCE: 7
ccacaccaca atgcttgccg aacatttttc ttttc 35

<210> SEQ ID NO 8
<211> LENGTH: 35
<212> TYPE: DNA
<213> ORGANISM: Artificial Sequence
<220> FEATURE:
<223> OTHER INFORMATION: primer

<400> SEQUENCE: 8
cacaatgagt actttaaccg ttaatggagt ccttg 35

<210> SEQ ID NO 9
<211> LENGTH: 17
<212> TYPE: DNA
<213> ORGANISM: Artificial Sequence
<220> FEATURE:
<223> OTHER INFORMATION: primer

<400> SEQUENCE: 9
acgcgccaag tcggacg 17

<210> SEQ ID NO 10
<211> LENGTH: 19
<212> TYPE: DNA
<213> ORGANISM: Artificial Sequence
<220> FEATURE:
<223> OTHER INFORMATION: primer

<400> SEQUENCE: 10
cgcacgatgt ttacctgcg 19

<210> SEQ ID NO 11
<211> LENGTH: 1122
<212> TYPE: DNA
<213> ORGANISM: Artificial Sequence
<220> FEATURE:
<223> OTHER INFORMATION: E.coli tyrA_M53I_A354V

<400> SEQUENCE: 11
atggttgctg aattgaccgc attacgcgat caaattgatg aagtcgataa agcgctgctg 60
aatttattag cgaagcgtct ggaactggtt gctgaagtgg gcgaggtgaa aagccgcttt 120
ggactgccta tttatgttcc ggagcgcgag gcatctattt tggcctcgcg tcgtgcagag 180
gcggaagctc tgggtgtacc gccagatctg attgaggatg ttttgcgtcg ggtgatgcgt 240
gaatcttact ccagtgaaaa cgacaaagga tttaaaacac tttgtccgtc actgcgtccg 300
gtggttatcg tcggcggtgg cggtcagatg ggacgcctgt tcgagaagat gctgaccctc 360
tcgggttatc aggtgcggat tctggagcaa catgactggg atcgagcggc tgatattgtt 420
gccgatgccg gaatggtgat tgttagtgtg ccaatccacg ttactgagca agttattggc 480
aaattaccgc ctttaccgaa agattgtatt ctggtcgatc tggcatcagt gaaaaatggg 540
ccattacagg ccatgctggt ggcgcatgat ggtccggtgc tggggctaca cccgatgttc 600
ggtccggaca gcggtagcct ggcaaagcaa gttgtggtct ggtgtgatgg acgtaaaccg 660
gaagcatacc aatggtttct ggagcaaatt caggtctggg gcgctcggct gcatcgtatt 720
agcgccgtcg agcacgatca gaatatggcg tttattcagg cactgcgcca ctttgctact 780
tttgcttacg ggctgcacct ggcagaagaa aatgttcagc ttgagcaact tctggcgctc 840
tcttcgccga tttaccgcct tgagctggcg atggtcgggc gactgtttgc tcaggatccg 900

```
cagctttatg ccgacatcat tatgtcgtca gagcgtaatc tggcgttaat caaacgttac    960

tataagcgtt tcggcgaggc gattgagttg ctggagcagg gcgataagca ggcgtttatt   1020

gacagtttcc gcaaggtgga gcactggttc ggcgattacg tgcagcgttt tcagagtgaa   1080

agccgcgtgt tattgcgtca ggcgaatgac aatcgccagt aa                      1122


<210> SEQ ID NO 12
<211> LENGTH: 36
<212> TYPE: DNA
<213> ORGANISM: Artificial Sequence
<220> FEATURE:
<223> OTHER INFORMATION: primer

<400> SEQUENCE: 12

ttcgagctcg gtaccctatc aaaaccgagt tcttcc                               36


<210> SEQ ID NO 13
<211> LENGTH: 36
<212> TYPE: DNA
<213> ORGANISM: Artificial Sequence
<220> FEATURE:
<223> OTHER INFORMATION: primer

<400> SEQUENCE: 13

gtcgttttta ggcctcctga caagtgtggc acatac                               36


<210> SEQ ID NO 14
<211> LENGTH: 36
<212> TYPE: DNA
<213> ORGANISM: Artificial Sequence
<220> FEATURE:
<223> OTHER INFORMATION: primer

<400> SEQUENCE: 14

tgacaatcgc cagtaatttt atcggctgat gattct                               36


<210> SEQ ID NO 15
<211> LENGTH: 36
<212> TYPE: DNA
<213> ORGANISM: Artificial Sequence
<220> FEATURE:
<223> OTHER INFORMATION: primer

<400> SEQUENCE: 15

actctagagg atccccaacg cgattgcatt cggctc                               36


<210> SEQ ID NO 16
<211> LENGTH: 36
<212> TYPE: DNA
<213> ORGANISM: Artificial Sequence
<220> FEATURE:
<223> OTHER INFORMATION: primer

<400> SEQUENCE: 16

gtgccacact tgtcaggagg cctaaaaacg accgag                               36


<210> SEQ ID NO 17
<211> LENGTH: 36
<212> TYPE: DNA
<213> ORGANISM: Artificial Sequence
<220> FEATURE:
<223> OTHER INFORMATION: primer

<400> SEQUENCE: 17
```

```
tcaattcagc aaccatgttg tgtctcctct aaagat                              36


<210> SEQ ID NO 18
<211> LENGTH: 36
<212> TYPE: DNA
<213> ORGANISM: Artificial Sequence
<220> FEATURE:
<223> OTHER INFORMATION: primer

<400> SEQUENCE: 18

ttagaggaga cacaacatgg ttgctgaatt gaccgc                              36


<210> SEQ ID NO 19
<211> LENGTH: 36
<212> TYPE: DNA
<213> ORGANISM: Artificial Sequence
<220> FEATURE:
<223> OTHER INFORMATION: primer

<400> SEQUENCE: 19

tcatcagccg ataaaattac tggcgattgt cattcg                              36


<210> SEQ ID NO 20
<211> LENGTH: 18
<212> TYPE: DNA
<213> ORGANISM: Artificial Sequence
<220> FEATURE:
<223> OTHER INFORMATION: primer

<400> SEQUENCE: 20

gcccactagt cgaatccc                                                  18


<210> SEQ ID NO 21
<211> LENGTH: 18
<212> TYPE: DNA
<213> ORGANISM: Artificial Sequence
<220> FEATURE:
<223> OTHER INFORMATION: primer

<400> SEQUENCE: 21

ctgtccgcaa cctgtgcg                                                  18


<210> SEQ ID NO 22
<211> LENGTH: 1053
<212> TYPE: DNA
<213> ORGANISM: Artificial Sequence
<220> FEATURE:
<223> OTHER INFORMATION: E.coli aroG_P150L

<400> SEQUENCE: 22

atgaattatc agaacgacga tttacgcatc aaagaaatca aagagttact tcctcctgtc     60

gcattgctgg aaaaattccc cgctactgaa aatgccgcga atacggttgc ccatgcccga    120

aaagcgatcc ataagatcct gaaaggtaat gatgatcgcc tgttggttgt gattggccca    180

tgctcaattc atgatcctgt cgcggcaaaa gagtatgcca ctcgcttgct ggcgctgcgt    240

gaagagctga aagatgagct ggaaatcgta atgcgcgtct attttgaaaa gccgcgtacc    300

acggtgggct ggaaagggct gattaacgat ccgcatatgg ataatagctt ccagatcaac    360

gacggtctgc gtatagcccg taaattgctg cttgatatta acgacagcgg tctgccagcg    420

gcaggtgagt ttctcgatat gatcacccca caatatctcg ctgacctgat gagctggggc    480

gcaattggcg cacgtaccac cgaatcgcag gtgcaccgcg aactggcatc agggctttct    540

tgtccggtcg gcttcaaaaa tggcaccgac ggtacgatta aagtggctat cgatgccatt    600
```

```
aatgccgccg gtgcgccgca ctgcttcctg tccgtaacga aatgggggca ttcggcgatt    660

gtgaatacca gcggtaacgg cgattgccat atcattctgc gcggcggtaa agagcctaac    720

tacagcgcga agcacgttgc tgaagtgaaa gaagggctga acaaagcagg cctgccagca    780

caggtgatga tcgatttcag ccatgctaac tcgtccaaac aattcaaaaa gcagatggat    840

gtttgtgctg acgtttgcca gcagattgcc ggtggcgaaa aggccattat tggcgtgatg    900

gtggaaagcc atctggtgga aggcaatcag agcctcgaga gcggggagcc gctggcctac    960

ggtaagagca tcaccgatgc ctgcatcggc tgggaagata ccgatgctct gttacgtcaa   1020

ctggcgaatg cagtaaaagc gcgtcgcggg taa                                1053


<210> SEQ ID NO 23
<211> LENGTH: 35
<212> TYPE: DNA
<213> ORGANISM: Artificial Sequence
<220> FEATURE:
<223> OTHER INFORMATION: primer

<400> SEQUENCE: 23

tcgagctcgg taccccccgg cggtatcgag gtagt                                35


<210> SEQ ID NO 24
<211> LENGTH: 35
<212> TYPE: DNA
<213> ORGANISM: Artificial Sequence
<220> FEATURE:
<223> OTHER INFORMATION: primer

<400> SEQUENCE: 24

gacaagttta gtactttaat cacccgcggg gaccc                                35


<210> SEQ ID NO 25
<211> LENGTH: 35
<212> TYPE: DNA
<213> ORGANISM: Artificial Sequence
<220> FEATURE:
<223> OTHER INFORMATION: primer

<400> SEQUENCE: 25

ggtgattaaa gtactaaact tgtcccgagg gtgag                                35


<210> SEQ ID NO 26
<211> LENGTH: 35
<212> TYPE: DNA
<213> ORGANISM: Artificial Sequence
<220> FEATURE:
<223> OTHER INFORMATION: primer

<400> SEQUENCE: 26

ctctagagga tcccctatca gtcacttccc tgaga                                35


<210> SEQ ID NO 27
<211> LENGTH: 35
<212> TYPE: DNA
<213> ORGANISM: Artificial Sequence
<220> FEATURE:
<223> OTHER INFORMATION: primer

<400> SEQUENCE: 27

gcgggtgatt aaagtgaggc ctaaaaacga ccgag                                35


<210> SEQ ID NO 28
```

<211> LENGTH: 35
<212> TYPE: DNA
<213> ORGANISM: Artificial Sequence
<220> FEATURE:
<223> OTHER INFORMATION: primer

<400> SEQUENCE: 28
gttctgataa ttcatgttgt gtctcctcta aagat 35

<210> SEQ ID NO 29
<211> LENGTH: 20
<212> TYPE: DNA
<213> ORGANISM: Artificial Sequence
<220> FEATURE:
<223> OTHER INFORMATION: primer

<400> SEQUENCE: 29
atgaattatc agaacgacga 20

<210> SEQ ID NO 30
<211> LENGTH: 35
<212> TYPE: DNA
<213> ORGANISM: Artificial Sequence
<220> FEATURE:
<223> OTHER INFORMATION: primer

<400> SEQUENCE: 30
cgggacaagt ttagtttacc cgcgacgcgc tttta 35

<210> SEQ ID NO 31
<211> LENGTH: 20
<212> TYPE: DNA
<213> ORGANISM: Artificial Sequence
<220> FEATURE:
<223> OTHER INFORMATION: primer

<400> SEQUENCE: 31
ttgatatgac cgcagcctga 20

<210> SEQ ID NO 32
<211> LENGTH: 20
<212> TYPE: DNA
<213> ORGANISM: Artificial Sequence
<220> FEATURE:
<223> OTHER INFORMATION: primer

<400> SEQUENCE: 32
ctgcattctc atcgatcttg 20

<210> SEQ ID NO 33
<211> LENGTH: 34
<212> TYPE: DNA
<213> ORGANISM: Artificial Sequence
<220> FEATURE:
<223> OTHER INFORMATION: primer

<400> SEQUENCE: 33
ttcgagctcg gtacccggag gggtttccac ctcg 34

<210> SEQ ID NO 34
<211> LENGTH: 40
<212> TYPE: DNA
<213> ORGANISM: Artificial Sequence
<220> FEATURE:
<223> OTHER INFORMATION: primer

<400> SEQUENCE: 34

```
tgggaagctt gtctcaatta tgtctgttgc tcaattagcg                        40


<210> SEQ ID NO 35
<211> LENGTH: 38
<212> TYPE: DNA
<213> ORGANISM: Artificial Sequence
<220> FEATURE:
<223> OTHER INFORMATION: primer

<400> SEQUENCE: 35

ctaattgagc aacagacata attgagacaa gcttccca                          38


<210> SEQ ID NO 36
<211> LENGTH: 36
<212> TYPE: DNA
<213> ORGANISM: Artificial Sequence
<220> FEATURE:
<223> OTHER INFORMATION: primer

<400> SEQUENCE: 36

aattggtgcg tcgctcatgg ggcacctacc gaggaa                            36


<210> SEQ ID NO 37
<211> LENGTH: 40
<212> TYPE: DNA
<213> ORGANISM: Artificial Sequence
<220> FEATURE:
<223> OTHER INFORMATION: primer

<400> SEQUENCE: 37

ttcctcggta ggtgccccat gagcgacgca ccaattgttg                        40


<210> SEQ ID NO 38
<211> LENGTH: 36
<212> TYPE: DNA
<213> ORGANISM: Artificial Sequence
<220> FEATURE:
<223> OTHER INFORMATION: primer

<400> SEQUENCE: 38

cgactctaga ggatccccc gaagagttcg gctgcg                             36


<210> SEQ ID NO 39
<211> LENGTH: 18
<212> TYPE: DNA
<213> ORGANISM: Artificial Sequence
<220> FEATURE:
<223> OTHER INFORMATION: primer

<400> SEQUENCE: 39

ccagcgatga tcgcgccg                                                18


<210> SEQ ID NO 40
<211> LENGTH: 18
<212> TYPE: DNA
<213> ORGANISM: Artificial Sequence
<220> FEATURE:
<223> OTHER INFORMATION: primer

<400> SEQUENCE: 40

atcgccgtgg agccagcc                                                18


<210> SEQ ID NO 41
<211> LENGTH: 35
<212> TYPE: DNA
```

<213> ORGANISM: Artificial Sequence
<220> FEATURE:
<223> OTHER INFORMATION: primer

<400> SEQUENCE: 41
ttcgagctcg gtacccgagg gctcactgac gttga 35

<210> SEQ ID NO 42
<211> LENGTH: 34
<212> TYPE: DNA
<213> ORGANISM: Artificial Sequence
<220> FEATURE:
<223> OTHER INFORMATION: primer

<400> SEQUENCE: 42
cgctgggatg tttctaccgg attcgattcc tcag 34

<210> SEQ ID NO 43
<211> LENGTH: 35
<212> TYPE: DNA
<213> ORGANISM: Artificial Sequence
<220> FEATURE:
<223> OTHER INFORMATION: primer

<400> SEQUENCE: 43
cgctcccaga agtaggctca aaccttgccc ataac 35

<210> SEQ ID NO 44
<211> LENGTH: 35
<212> TYPE: DNA
<213> ORGANISM: Artificial Sequence
<220> FEATURE:
<223> OTHER INFORMATION: primer

<400> SEQUENCE: 44
ctctagagga tccccctccc ccaaaccacg ctttt 35

<210> SEQ ID NO 45
<211> LENGTH: 318
<212> TYPE: DNA
<213> ORGANISM: Artificial Sequence
<220> FEATURE:
<223> OTHER INFORMATION: CJ7 promoter

<400> SEQUENCE: 45
agaaacatcc cagcgctact aatagggagc gttgaccttc cttccacgga ccggtaatcg 60
gagtgcctaa aaccgcatgc ggcttaggct ccaagatagg ttctgcgcgg ccgggtaatg 120
catcttcttt agcaacaagt tgaggggtag gtgcaaataa gaacgacata gaaatcgtct 180
cctttctgtt tttaatcaac atacaccacc acctaaaaat tccccgacca gcaagttcac 240
agtattcggg cacaatatcg ttgccaaaat attgtttcgg aatatcatgg gatacgtacc 300
caacgaaagg aaacactc 318

<210> SEQ ID NO 46
<211> LENGTH: 35
<212> TYPE: DNA
<213> ORGANISM: Artificial Sequence
<220> FEATURE:
<223> OTHER INFORMATION: primer

<400> SEQUENCE: 46
ggaatcgaat ccggtagaaa catcccagcg ctact 35

<210> SEQ ID NO 47
<211> LENGTH: 35
<212> TYPE: DNA
<213> ORGANISM: Artificial Sequence
<220> FEATURE:
<223> OTHER INFORMATION: primer

<400> SEQUENCE: 47
tactttcaga actcatgagt gtttcctttc gttgg 35

<210> SEQ ID NO 48
<211> LENGTH: 35
<212> TYPE: DNA
<213> ORGANISM: Artificial Sequence
<220> FEATURE:
<223> OTHER INFORMATION: primer

<400> SEQUENCE: 48
acgaaaggaa acactcatga gttctgaaag tagtc 35

<210> SEQ ID NO 49
<211> LENGTH: 35
<212> TYPE: DNA
<213> ORGANISM: Artificial Sequence
<220> FEATURE:
<223> OTHER INFORMATION: primer

<400> SEQUENCE: 49
gggcaaggtt tgagcctact tctgggagcg ccaca 35

<210> SEQ ID NO 50
<211> LENGTH: 21
<212> TYPE: DNA
<213> ORGANISM: Artificial Sequence
<220> FEATURE:
<223> OTHER INFORMATION: primer

<400> SEQUENCE: 50
acattaagtg gtaggcgctg a 21

<210> SEQ ID NO 51
<211> LENGTH: 20
<212> TYPE: DNA
<213> ORGANISM: Artificial Sequence
<220> FEATURE:
<223> OTHER INFORMATION: primer

<400> SEQUENCE: 51
cataacaggg cagaacaaac 20

<210> SEQ ID NO 52
<211> LENGTH: 307
<212> TYPE: PRT
<213> ORGANISM: Artificial Sequence
<220> FEATURE:
<223> OTHER INFORMATION: wex AA seq

<400> SEQUENCE: 52

Met Asn Ser Lys Lys Ala Thr Leu Ile Gly Leu Thr Ala Val Val Leu
1 5 10 15

Trp Ser Ser Ile Val Gly Leu Ile Arg Gly Val Ser Glu His Leu Gly
20 25 30

Ala Thr Gly Gly Ala Ala Met Met Tyr Ser Val Ala Ser Leu Phe Leu
35 40 45

Leu Leu Ser Val Gly Phe Pro Lys Leu Gly Ser Phe Pro Lys Lys Tyr

```
    50                  55                  60

Leu Leu Trp Gly Ser Leu Leu Phe Val Ser Tyr Glu Leu Cys Leu Ser
65                  70                  75                  80

Leu Ser Ile Gly Tyr Ala Asn Thr Gly Arg Gln Ala Ile Glu Val Ser
                85                  90                  95

Met Val Asn Tyr Leu Trp Pro Ala Phe Thr Leu Ile Ala Ala Ile Ala
            100                 105                 110

Phe Asn Arg Gln Arg Ala Asn Trp Met Val Val Pro Gly Phe Ile Leu
        115                 120                 125

Ser Ile Ile Gly Ile Cys Trp Val Leu Gly Gly Asp Gln Gly Leu Asp
    130                 135                 140

Leu Ala Gly Met Leu Gly Asn Val Gln Asp Asn Pro Leu Ser Tyr Gly
145                 150                 155                 160

Leu Ala Phe Leu Gly Ala Val Ile Trp Ala Ala Tyr Cys Thr Val Thr
                165                 170                 175

Ala Arg Leu Ala Lys Gly Lys Asn Gly Val Thr Leu Phe Phe Ile Leu
            180                 185                 190

Val Ala Leu Thr Leu Trp Val Lys Phe Phe Phe Gly Asp His Arg Pro
        195                 200                 205

Met Ser Phe Ser Leu Pro Ala Ile Val Tyr Leu Leu Leu Ala Ala Ala
    210                 215                 220

Ala Met Gly Phe Gly Tyr Ala Ala Trp Asn Val Gly Ile Leu His Gly
225                 230                 235                 240

Asn Val Thr Val Leu Ala Gly Val Ser Tyr Phe Ile Pro Val Phe Ser
                245                 250                 255

Ala Ala Leu Ser Ala Met Val Leu His Ala Pro Leu Pro Arg Ser Phe
            260                 265                 270

Trp Val Gly Ala Ser Leu Val Cys Ala Gly Ser Ile Leu Cys Trp Leu
        275                 280                 285

Ala Thr Arg Ala Arg Arg Ala Ser Ala Ala Gln Glu Asp Ala Val Ala
    290                 295                 300

Asp Cys Leu
305


<210> SEQ ID NO 53
<211> LENGTH: 20
<212> TYPE: DNA
<213> ORGANISM: Artificial Sequence
<220> FEATURE:
<223> OTHER INFORMATION: primer

<400> SEQUENCE: 53

cggattatgc caatgatgtg                                                  20


<210> SEQ ID NO 54
<211> LENGTH: 20
<212> TYPE: DNA
<213> ORGANISM: Artificial Sequence
<220> FEATURE:
<223> OTHER INFORMATION: primer

<400> SEQUENCE: 54

cacgatcacc aacattcagg                                                  20


<210> SEQ ID NO 55
<211> LENGTH: 40
<212> TYPE: DNA
<213> ORGANISM: Artificial Sequence
```

<220> FEATURE:
<223> OTHER INFORMATION: primer

<400> SEQUENCE: 55
gtgtcctacg aactctgcgc atcgctctcc atcggttatg 40

<210> SEQ ID NO 56
<211> LENGTH: 40
<212> TYPE: DNA
<213> ORGANISM: Artificial Sequence
<220> FEATURE:
<223> OTHER INFORMATION: primer

<400> SEQUENCE: 56
cataaccgat ggagagcgat gcgcagagtt cgtaggacac 40

<210> SEQ ID NO 57
<211> LENGTH: 40
<212> TYPE: DNA
<213> ORGANISM: Artificial Sequence
<220> FEATURE:
<223> OTHER INFORMATION: primer

<400> SEQUENCE: 57
gtgtcctacg aactctgcat ctcgctctcc atcggttatg 40

<210> SEQ ID NO 58
<211> LENGTH: 40
<212> TYPE: DNA
<213> ORGANISM: Artificial Sequence
<220> FEATURE:
<223> OTHER INFORMATION: primer

<400> SEQUENCE: 58
cataaccgat ggagagcgag atgcagagtt cgtaggacac 40

<210> SEQ ID NO 59
<211> LENGTH: 37
<212> TYPE: DNA
<213> ORGANISM: Artificial Sequence
<220> FEATURE:
<223> OTHER INFORMATION: primer

<400> SEQUENCE: 59
gtgtcctacg aactctgcgg ctcgctctcc atcggtt 37

<210> SEQ ID NO 60
<211> LENGTH: 36
<212> TYPE: DNA
<213> ORGANISM: Artificial Sequence
<220> FEATURE:
<223> OTHER INFORMATION: primer

<400> SEQUENCE: 60
cataaccgat ggagagcgag ccgcagagtt cgtagg 36

<210> SEQ ID NO 61
<211> LENGTH: 37
<212> TYPE: DNA
<213> ORGANISM: Artificial Sequence
<220> FEATURE:
<223> OTHER INFORMATION: primer

<400> SEQUENCE: 61
gtgtcctacg aactctgcat gtcgctctcc atcggtt 37

<210> SEQ ID NO 62
<211> LENGTH: 36
<212> TYPE: DNA
<213> ORGANISM: Artificial Sequence
<220> FEATURE:
<223> OTHER INFORMATION: primer

<400> SEQUENCE: 62
cataaccgat ggagagcgac atgcagagtt cgtagg 36

<210> SEQ ID NO 63
<211> LENGTH: 37
<212> TYPE: DNA
<213> ORGANISM: Artificial Sequence
<220> FEATURE:
<223> OTHER INFORMATION: primer

<400> SEQUENCE: 63
gtgtcctacg aactctgcac ctcgctctcc atcggtt 37

<210> SEQ ID NO 64
<211> LENGTH: 36
<212> TYPE: DNA
<213> ORGANISM: Artificial Sequence
<220> FEATURE:
<223> OTHER INFORMATION: primer

<400> SEQUENCE: 64
cataaccgat ggagagcgag gtgcagagtt cgtagg 36

<210> SEQ ID NO 65
<211> LENGTH: 37
<212> TYPE: DNA
<213> ORGANISM: Artificial Sequence
<220> FEATURE:
<223> OTHER INFORMATION: primer

<400> SEQUENCE: 65
gtgtcctacg aactctgcta ctcgctctcc atcggtt 37

<210> SEQ ID NO 66
<211> LENGTH: 36
<212> TYPE: DNA
<213> ORGANISM: Artificial Sequence
<220> FEATURE:
<223> OTHER INFORMATION: primer

<400> SEQUENCE: 66
cataaccgat ggagagcgag tagcagagtt cgtagg 36

<210> SEQ ID NO 67
<211> LENGTH: 37
<212> TYPE: DNA
<213> ORGANISM: Artificial Sequence
<220> FEATURE:
<223> OTHER INFORMATION: primer

<400> SEQUENCE: 67
gtgtcctacg aactctgcaa ctcgctctcc atcggtt 37

<210> SEQ ID NO 68
<211> LENGTH: 36
<212> TYPE: DNA
<213> ORGANISM: Artificial Sequence
<220> FEATURE:
<223> OTHER INFORMATION: primer

<400> SEQUENCE: 68
cataaccgat ggagagcgag ttgcagagtt cgtagg 36

<210> SEQ ID NO 69
<211> LENGTH: 37
<212> TYPE: DNA
<213> ORGANISM: Artificial Sequence
<220> FEATURE:
<223> OTHER INFORMATION: primer

<400> SEQUENCE: 69
gtgtcctacg aactctgctg gtcgctctcc atcggtt 37

<210> SEQ ID NO 70
<211> LENGTH: 36
<212> TYPE: DNA
<213> ORGANISM: Artificial Sequence
<220> FEATURE:
<223> OTHER INFORMATION: primer

<400> SEQUENCE: 70
cataaccgat ggagagcgac cagcagagtt cgtagg 36

<210> SEQ ID NO 71
<211> LENGTH: 37
<212> TYPE: DNA
<213> ORGANISM: Artificial Sequence
<220> FEATURE:
<223> OTHER INFORMATION: primer

<400> SEQUENCE: 71
gtgtcctacg aactctgccg ctcgctctcc atcggtt 37

<210> SEQ ID NO 72
<211> LENGTH: 36
<212> TYPE: DNA
<213> ORGANISM: Artificial Sequence
<220> FEATURE:
<223> OTHER INFORMATION: primer

<400> SEQUENCE: 72
cataaccgat ggagagcgag cggcagagtt cgtagg 36

<210> SEQ ID NO 73
<211> LENGTH: 37
<212> TYPE: DNA
<213> ORGANISM: Artificial Sequence
<220> FEATURE:
<223> OTHER INFORMATION: primer

<400> SEQUENCE: 73
gtgtcctacg aactctgctc ctcgctctcc atcggtt 37

<210> SEQ ID NO 74
<211> LENGTH: 36
<212> TYPE: DNA
<213> ORGANISM: Artificial Sequence
<220> FEATURE:
<223> OTHER INFORMATION: primer

<400> SEQUENCE: 74
cataaccgat ggagagcgag gagcagagtt cgtagg 36

<210> SEQ ID NO 75

<211> LENGTH: 37
<212> TYPE: DNA
<213> ORGANISM: Artificial Sequence
<220> FEATURE:
<223> OTHER INFORMATION: primer

<400> SEQUENCE: 75
gtgtcctacg aactctgccc atcgctctcc atcggtt 37

<210> SEQ ID NO 76
<211> LENGTH: 36
<212> TYPE: DNA
<213> ORGANISM: Artificial Sequence
<220> FEATURE:
<223> OTHER INFORMATION: primer

<400> SEQUENCE: 76
cataaccgat ggagagcgat gggcagagtt cgtagg 36

<210> SEQ ID NO 77
<211> LENGTH: 307
<212> TYPE: PRT
<213> ORGANISM: Artificial Sequence
<220> FEATURE:
<223> OTHER INFORMATION: wex L79I

<400> SEQUENCE: 77

```
Met Asn Ser Lys Lys Ala Thr Leu Ile Gly Leu Thr Ala Val Val Leu
1               5                   10                  15

Trp Ser Ser Ile Val Gly Leu Ile Arg Gly Val Ser Glu His Leu Gly
            20                  25                  30

Ala Thr Gly Gly Ala Ala Met Met Tyr Ser Val Ala Ser Leu Phe Leu
        35                  40                  45

Leu Leu Ser Val Gly Phe Pro Lys Leu Gly Ser Phe Pro Lys Lys Tyr
    50                  55                  60

Leu Leu Trp Gly Ser Leu Leu Phe Val Ser Tyr Glu Leu Cys Ile Ser
65                  70                  75                  80

Leu Ser Ile Gly Tyr Ala Asn Thr Gly Arg Gln Ala Ile Glu Val Ser
                85                  90                  95

Met Val Asn Tyr Leu Trp Pro Ala Phe Thr Leu Ile Ala Ala Ile Ala
            100                 105                 110

Phe Asn Arg Gln Arg Ala Asn Trp Met Val Val Pro Gly Phe Ile Leu
        115                 120                 125

Ser Ile Ile Gly Ile Cys Trp Val Leu Gly Gly Asp Gln Gly Leu Asp
    130                 135                 140

Leu Ala Gly Met Leu Gly Asn Val Gln Asp Asn Pro Leu Ser Tyr Gly
145                 150                 155                 160

Leu Ala Phe Leu Gly Ala Val Ile Trp Ala Ala Tyr Cys Thr Val Thr
                165                 170                 175

Ala Arg Leu Ala Lys Gly Lys Asn Gly Val Thr Leu Phe Phe Ile Leu
            180                 185                 190

Val Ala Leu Thr Leu Trp Val Lys Phe Phe Phe Gly Asp His Arg Pro
        195                 200                 205

Met Ser Phe Ser Leu Pro Ala Ile Val Tyr Leu Leu Leu Ala Ala Ala
    210                 215                 220

Ala Met Gly Phe Gly Tyr Ala Ala Trp Asn Val Gly Ile Leu His Gly
225                 230                 235                 240

Asn Val Thr Val Leu Ala Gly Val Ser Tyr Phe Ile Pro Val Phe Ser
                245                 250                 255
```

```
Ala Ala Leu Ser Ala Met Val Leu His Ala Pro Leu Pro Arg Ser Phe
            260                 265                 270

Trp Val Gly Ala Ser Leu Val Cys Ala Gly Ser Ile Leu Cys Trp Leu
        275                 280                 285

Ala Thr Arg Ala Arg Arg Ala Ser Ala Ala Gln Glu Asp Ala Val Ala
    290                 295                 300

Asp Cys Leu
305


<210> SEQ ID NO 78
<211> LENGTH: 307
<212> TYPE: PRT
<213> ORGANISM: Artificial Sequence
<220> FEATURE:
<223> OTHER INFORMATION: wex L79M

<400> SEQUENCE: 78

Met Asn Ser Lys Lys Ala Thr Leu Ile Gly Leu Thr Ala Val Val Leu
1               5                   10                  15

Trp Ser Ser Ile Val Gly Leu Ile Arg Gly Val Ser Glu His Leu Gly
            20                  25                  30

Ala Thr Gly Gly Ala Ala Met Met Tyr Ser Val Ala Ser Leu Phe Leu
        35                  40                  45

Leu Leu Ser Val Gly Phe Pro Lys Leu Gly Ser Phe Pro Lys Lys Tyr
    50                  55                  60

Leu Leu Trp Gly Ser Leu Leu Phe Val Ser Tyr Glu Leu Cys Met Ser
65                  70                  75                  80

Leu Ser Ile Gly Tyr Ala Asn Thr Gly Arg Gln Ala Ile Glu Val Ser
                85                  90                  95

Met Val Asn Tyr Leu Trp Pro Ala Phe Thr Leu Ile Ala Ala Ile Ala
            100                 105                 110

Phe Asn Arg Gln Arg Ala Asn Trp Met Val Val Pro Gly Phe Ile Leu
        115                 120                 125

Ser Ile Ile Gly Ile Cys Trp Val Leu Gly Gly Asp Gln Gly Leu Asp
    130                 135                 140

Leu Ala Gly Met Leu Gly Asn Val Gln Asp Asn Pro Leu Ser Tyr Gly
145                 150                 155                 160

Leu Ala Phe Leu Gly Ala Val Ile Trp Ala Ala Tyr Cys Thr Val Thr
                165                 170                 175

Ala Arg Leu Ala Lys Gly Lys Asn Gly Val Thr Leu Phe Phe Ile Leu
            180                 185                 190

Val Ala Leu Thr Leu Trp Val Lys Phe Phe Phe Gly Asp His Arg Pro
        195                 200                 205

Met Ser Phe Ser Leu Pro Ala Ile Val Tyr Leu Leu Leu Ala Ala Ala
    210                 215                 220

Ala Met Gly Phe Gly Tyr Ala Ala Trp Asn Val Gly Ile Leu His Gly
225                 230                 235                 240

Asn Val Thr Val Leu Ala Gly Val Ser Tyr Phe Ile Pro Val Phe Ser
                245                 250                 255

Ala Ala Leu Ser Ala Met Val Leu His Ala Pro Leu Pro Arg Ser Phe
            260                 265                 270

Trp Val Gly Ala Ser Leu Val Cys Ala Gly Ser Ile Leu Cys Trp Leu
        275                 280                 285

Ala Thr Arg Ala Arg Arg Ala Ser Ala Ala Gln Glu Asp Ala Val Ala
    290                 295                 300
```

```
Asp Cys Leu
305


<210> SEQ ID NO 79
<211> LENGTH: 307
<212> TYPE: PRT
<213> ORGANISM: Artificial Sequence
<220> FEATURE:
<223> OTHER INFORMATION: wex L79T

<400> SEQUENCE: 79

Met Asn Ser Lys Lys Ala Thr Leu Ile Gly Leu Thr Ala Val Val Leu
1               5                   10                  15

Trp Ser Ser Ile Val Gly Leu Ile Arg Gly Val Ser Glu His Leu Gly
            20                  25                  30

Ala Thr Gly Gly Ala Ala Met Met Tyr Ser Val Ala Ser Leu Phe Leu
        35                  40                  45

Leu Leu Ser Val Gly Phe Pro Lys Leu Gly Ser Phe Pro Lys Lys Tyr
    50                  55                  60

Leu Leu Trp Gly Ser Leu Leu Phe Val Ser Tyr Glu Leu Cys Thr Ser
65                  70                  75                  80

Leu Ser Ile Gly Tyr Ala Asn Thr Gly Arg Gln Ala Ile Glu Val Ser
                85                  90                  95

Met Val Asn Tyr Leu Trp Pro Ala Phe Thr Leu Ile Ala Ala Ile Ala
            100                 105                 110

Phe Asn Arg Gln Arg Ala Asn Trp Met Val Val Pro Gly Phe Ile Leu
        115                 120                 125

Ser Ile Ile Gly Ile Cys Trp Val Leu Gly Gly Asp Gln Gly Leu Asp
    130                 135                 140

Leu Ala Gly Met Leu Gly Asn Val Gln Asp Asn Pro Leu Ser Tyr Gly
145                 150                 155                 160

Leu Ala Phe Leu Gly Ala Val Ile Trp Ala Ala Tyr Cys Thr Val Thr
                165                 170                 175

Ala Arg Leu Ala Lys Gly Lys Asn Gly Val Thr Leu Phe Phe Ile Leu
            180                 185                 190

Val Ala Leu Thr Leu Trp Val Lys Phe Phe Phe Gly Asp His Arg Pro
        195                 200                 205

Met Ser Phe Ser Leu Pro Ala Ile Val Tyr Leu Leu Leu Ala Ala Ala
    210                 215                 220

Ala Met Gly Phe Gly Tyr Ala Ala Trp Asn Val Gly Ile Leu His Gly
225                 230                 235                 240

Asn Val Thr Val Leu Ala Gly Val Ser Tyr Phe Ile Pro Val Phe Ser
                245                 250                 255

Ala Ala Leu Ser Ala Met Val Leu His Ala Pro Leu Pro Arg Ser Phe
            260                 265                 270

Trp Val Gly Ala Ser Leu Val Cys Ala Gly Ser Ile Leu Cys Trp Leu
        275                 280                 285

Ala Thr Arg Ala Arg Arg Ala Ser Ala Ala Gln Glu Asp Ala Val Ala
    290                 295                 300

Asp Cys Leu
305


<210> SEQ ID NO 80
<211> LENGTH: 307
<212> TYPE: PRT
<213> ORGANISM: Artificial Sequence
```

```
<220> FEATURE:
<223> OTHER INFORMATION: wex L79Y

<400> SEQUENCE: 80

Met Asn Ser Lys Lys Ala Thr Leu Ile Gly Leu Thr Ala Val Val Leu
1               5                   10                  15

Trp Ser Ser Ile Val Gly Leu Ile Arg Gly Val Ser Glu His Leu Gly
            20                  25                  30

Ala Thr Gly Gly Ala Ala Met Met Tyr Ser Val Ala Ser Leu Phe Leu
        35                  40                  45

Leu Leu Ser Val Gly Phe Pro Lys Leu Gly Ser Phe Pro Lys Lys Tyr
    50                  55                  60

Leu Leu Trp Gly Ser Leu Leu Phe Val Ser Tyr Glu Leu Cys Tyr Ser
65                  70                  75                  80

Leu Ser Ile Gly Tyr Ala Asn Thr Gly Arg Gln Ala Ile Glu Val Ser
                85                  90                  95

Met Val Asn Tyr Leu Trp Pro Ala Phe Thr Leu Ile Ala Ala Ile Ala
            100                 105                 110

Phe Asn Arg Gln Arg Ala Asn Trp Met Val Val Pro Gly Phe Ile Leu
        115                 120                 125

Ser Ile Ile Gly Ile Cys Trp Val Leu Gly Gly Asp Gln Gly Leu Asp
    130                 135                 140

Leu Ala Gly Met Leu Gly Asn Val Gln Asp Asn Pro Leu Ser Tyr Gly
145                 150                 155                 160

Leu Ala Phe Leu Gly Ala Val Ile Trp Ala Ala Tyr Cys Thr Val Thr
                165                 170                 175

Ala Arg Leu Ala Lys Gly Lys Asn Gly Val Thr Leu Phe Phe Ile Leu
            180                 185                 190

Val Ala Leu Thr Leu Trp Val Lys Phe Phe Phe Gly Asp His Arg Pro
        195                 200                 205

Met Ser Phe Ser Leu Pro Ala Ile Val Tyr Leu Leu Leu Ala Ala Ala
    210                 215                 220

Ala Met Gly Phe Gly Tyr Ala Ala Trp Asn Val Gly Ile Leu His Gly
225                 230                 235                 240

Asn Val Thr Val Leu Ala Gly Val Ser Tyr Phe Ile Pro Val Phe Ser
                245                 250                 255

Ala Ala Leu Ser Ala Met Val Leu His Ala Pro Leu Pro Arg Ser Phe
            260                 265                 270

Trp Val Gly Ala Ser Leu Val Cys Ala Gly Ser Ile Leu Cys Trp Leu
        275                 280                 285

Ala Thr Arg Ala Arg Arg Ala Ser Ala Ala Gln Glu Asp Ala Val Ala
    290                 295                 300

Asp Cys Leu
305


<210> SEQ ID NO 81
<211> LENGTH: 307
<212> TYPE: PRT
<213> ORGANISM: Artificial Sequence
<220> FEATURE:
<223> OTHER INFORMATION: wex L79N

<400> SEQUENCE: 81

Met Asn Ser Lys Lys Ala Thr Leu Ile Gly Leu Thr Ala Val Val Leu
1               5                   10                  15

Trp Ser Ser Ile Val Gly Leu Ile Arg Gly Val Ser Glu His Leu Gly
```

-continued

```
            20                  25                  30

Ala Thr Gly Gly Ala Ala Met Met Tyr Ser Val Ala Ser Leu Phe Leu
        35                  40                  45

Leu Leu Ser Val Gly Phe Pro Lys Leu Gly Ser Phe Pro Lys Lys Tyr
    50                  55                  60

Leu Leu Trp Gly Ser Leu Leu Phe Val Ser Tyr Glu Leu Cys Asn Ser
65                  70                  75                  80

Leu Ser Ile Gly Tyr Ala Asn Thr Gly Arg Gln Ala Ile Glu Val Ser
                85                  90                  95

Met Val Asn Tyr Leu Trp Pro Ala Phe Thr Leu Ile Ala Ala Ile Ala
            100                 105                 110

Phe Asn Arg Gln Arg Ala Asn Trp Met Val Val Pro Gly Phe Ile Leu
        115                 120                 125

Ser Ile Ile Gly Ile Cys Trp Val Leu Gly Gly Asp Gln Gly Leu Asp
    130                 135                 140

Leu Ala Gly Met Leu Gly Asn Val Gln Asp Asn Pro Leu Ser Tyr Gly
145                 150                 155                 160

Leu Ala Phe Leu Gly Ala Val Ile Trp Ala Ala Tyr Cys Thr Val Thr
                165                 170                 175

Ala Arg Leu Ala Lys Gly Lys Asn Gly Val Thr Leu Phe Phe Ile Leu
            180                 185                 190

Val Ala Leu Thr Leu Trp Val Lys Phe Phe Phe Gly Asp His Arg Pro
        195                 200                 205

Met Ser Phe Ser Leu Pro Ala Ile Val Tyr Leu Leu Leu Ala Ala Ala
    210                 215                 220

Ala Met Gly Phe Gly Tyr Ala Ala Trp Asn Val Gly Ile Leu His Gly
225                 230                 235                 240

Asn Val Thr Val Leu Ala Gly Val Ser Tyr Phe Ile Pro Val Phe Ser
                245                 250                 255

Ala Ala Leu Ser Ala Met Val Leu His Ala Pro Leu Pro Arg Ser Phe
            260                 265                 270

Trp Val Gly Ala Ser Leu Val Cys Ala Gly Ser Ile Leu Cys Trp Leu
        275                 280                 285

Ala Thr Arg Ala Arg Arg Ala Ser Ala Ala Gln Glu Asp Ala Val Ala
    290                 295                 300

Asp Cys Leu
305


<210> SEQ ID NO 82
<211> LENGTH: 307
<212> TYPE: PRT
<213> ORGANISM: Artificial Sequence
<220> FEATURE:
<223> OTHER INFORMATION: wex L79R

<400> SEQUENCE: 82

Met Asn Ser Lys Lys Ala Thr Leu Ile Gly Leu Thr Ala Val Val Leu
1               5                   10                  15

Trp Ser Ser Ile Val Gly Leu Ile Arg Gly Val Ser Glu His Leu Gly
            20                  25                  30

Ala Thr Gly Gly Ala Ala Met Met Tyr Ser Val Ala Ser Leu Phe Leu
        35                  40                  45

Leu Leu Ser Val Gly Phe Pro Lys Leu Gly Ser Phe Pro Lys Lys Tyr
    50                  55                  60

Leu Leu Trp Gly Ser Leu Leu Phe Val Ser Tyr Glu Leu Cys Arg Ser
```

```
65                  70                  75                  80

Leu Ser Ile Gly Tyr Ala Asn Thr Gly Arg Gln Ala Ile Glu Val Ser
                85                  90                  95

Met Val Asn Tyr Leu Trp Pro Ala Phe Thr Leu Ile Ala Ala Ile Ala
            100                 105                 110

Phe Asn Arg Gln Arg Ala Asn Trp Met Val Val Pro Gly Phe Ile Leu
        115                 120                 125

Ser Ile Ile Gly Ile Cys Trp Val Leu Gly Gly Asp Gln Gly Leu Asp
    130                 135                 140

Leu Ala Gly Met Leu Gly Asn Val Gln Asp Asn Pro Leu Ser Tyr Gly
145                 150                 155                 160

Leu Ala Phe Leu Gly Ala Val Ile Trp Ala Ala Tyr Cys Thr Val Thr
                165                 170                 175

Ala Arg Leu Ala Lys Gly Lys Asn Gly Val Thr Leu Phe Phe Ile Leu
            180                 185                 190

Val Ala Leu Thr Leu Trp Val Lys Phe Phe Phe Gly Asp His Arg Pro
        195                 200                 205

Met Ser Phe Ser Leu Pro Ala Ile Val Tyr Leu Leu Leu Ala Ala Ala
    210                 215                 220

Ala Met Gly Phe Gly Tyr Ala Ala Trp Asn Val Gly Ile Leu His Gly
225                 230                 235                 240

Asn Val Thr Val Leu Ala Gly Val Ser Tyr Phe Ile Pro Val Phe Ser
                245                 250                 255

Ala Ala Leu Ser Ala Met Val Leu His Ala Pro Leu Pro Arg Ser Phe
            260                 265                 270

Trp Val Gly Ala Ser Leu Val Cys Ala Gly Ser Ile Leu Cys Trp Leu
        275                 280                 285

Ala Thr Arg Ala Arg Arg Ala Ser Ala Ala Gln Glu Asp Ala Val Ala
    290                 295                 300

Asp Cys Leu
305


<210> SEQ ID NO 83
<211> LENGTH: 307
<212> TYPE: PRT
<213> ORGANISM: Artificial Sequence
<220> FEATURE:
<223> OTHER INFORMATION: wex L79W

<400> SEQUENCE: 83

Met Asn Ser Lys Lys Ala Thr Leu Ile Gly Leu Thr Ala Val Val Leu
1               5                   10                  15

Trp Ser Ser Ile Val Gly Leu Ile Arg Gly Val Ser Glu His Leu Gly
            20                  25                  30

Ala Thr Gly Gly Ala Ala Met Met Tyr Ser Val Ala Ser Leu Phe Leu
        35                  40                  45

Leu Leu Ser Val Gly Phe Pro Lys Leu Gly Ser Phe Pro Lys Lys Tyr
    50                  55                  60

Leu Leu Trp Gly Ser Leu Leu Phe Val Ser Tyr Glu Leu Cys Trp Ser
65                  70                  75                  80

Leu Ser Ile Gly Tyr Ala Asn Thr Gly Arg Gln Ala Ile Glu Val Ser
                85                  90                  95

Met Val Asn Tyr Leu Trp Pro Ala Phe Thr Leu Ile Ala Ala Ile Ala
            100                 105                 110

Phe Asn Arg Gln Arg Ala Asn Trp Met Val Val Pro Gly Phe Ile Leu
```

115 120 125

Ser Ile Ile Gly Ile Cys Trp Val Leu Gly Gly Asp Gln Gly Leu Asp
130 135 140

Leu Ala Gly Met Leu Gly Asn Val Gln Asp Asn Pro Leu Ser Tyr Gly
145 150 155 160

Leu Ala Phe Leu Gly Ala Val Ile Trp Ala Ala Tyr Cys Thr Val Thr
165 170 175

Ala Arg Leu Ala Lys Gly Lys Asn Gly Val Thr Leu Phe Phe Ile Leu
180 185 190

Val Ala Leu Thr Leu Trp Val Lys Phe Phe Phe Gly Asp His Arg Pro
195 200 205

Met Ser Phe Ser Leu Pro Ala Ile Val Tyr Leu Leu Leu Ala Ala Ala
210 215 220

Ala Met Gly Phe Gly Tyr Ala Ala Trp Asn Val Gly Ile Leu His Gly
225 230 235 240

Asn Val Thr Val Leu Ala Gly Val Ser Tyr Phe Ile Pro Val Phe Ser
245 250 255

Ala Ala Leu Ser Ala Met Val Leu His Ala Pro Leu Pro Arg Ser Phe
260 265 270

Trp Val Gly Ala Ser Leu Val Cys Ala Gly Ser Ile Leu Cys Trp Leu
275 280 285

Ala Thr Arg Ala Arg Arg Ala Ser Ala Ala Gln Glu Asp Ala Val Ala
290 295 300

Asp Cys Leu
305

<210> SEQ ID NO 84
<211> LENGTH: 307
<212> TYPE: PRT
<213> ORGANISM: Artificial Sequence
<220> FEATURE:
<223> OTHER INFORMATION: wex L79S

<400> SEQUENCE: 84

Met Asn Ser Lys Lys Ala Thr Leu Ile Gly Leu Thr Ala Val Val Leu
1 5 10 15

Trp Ser Ser Ile Val Gly Leu Ile Arg Gly Val Ser Glu His Leu Gly
20 25 30

Ala Thr Gly Gly Ala Ala Met Met Tyr Ser Val Ala Ser Leu Phe Leu
35 40 45

Leu Leu Ser Val Gly Phe Pro Lys Leu Gly Ser Phe Pro Lys Lys Tyr
50 55 60

Leu Leu Trp Gly Ser Leu Leu Phe Val Ser Tyr Glu Leu Cys Ser Ser
65 70 75 80

Leu Ser Ile Gly Tyr Ala Asn Thr Gly Arg Gln Ala Ile Glu Val Ser
85 90 95

Met Val Asn Tyr Leu Trp Pro Ala Phe Thr Leu Ile Ala Ala Ile Ala
100 105 110

Phe Asn Arg Gln Arg Ala Asn Trp Met Val Val Pro Gly Phe Ile Leu
115 120 125

Ser Ile Ile Gly Ile Cys Trp Val Leu Gly Gly Asp Gln Gly Leu Asp
130 135 140

Leu Ala Gly Met Leu Gly Asn Val Gln Asp Asn Pro Leu Ser Tyr Gly
145 150 155 160

Leu Ala Phe Leu Gly Ala Val Ile Trp Ala Ala Tyr Cys Thr Val Thr

```
                165                 170                 175

Ala Arg Leu Ala Lys Gly Lys Asn Gly Val Thr Leu Phe Phe Ile Leu
            180                 185                 190

Val Ala Leu Thr Leu Trp Val Lys Phe Phe Phe Gly Asp His Arg Pro
        195                 200                 205

Met Ser Phe Ser Leu Pro Ala Ile Val Tyr Leu Leu Leu Ala Ala Ala
    210                 215                 220

Ala Met Gly Phe Gly Tyr Ala Ala Trp Asn Val Gly Ile Leu His Gly
225                 230                 235                 240

Asn Val Thr Val Leu Ala Gly Val Ser Tyr Phe Ile Pro Val Phe Ser
                245                 250                 255

Ala Ala Leu Ser Ala Met Val Leu His Ala Pro Leu Pro Arg Ser Phe
            260                 265                 270

Trp Val Gly Ala Ser Leu Val Cys Ala Gly Ser Ile Leu Cys Trp Leu
        275                 280                 285

Ala Thr Arg Ala Arg Arg Ala Ser Ala Ala Gln Glu Asp Ala Val Ala
    290                 295                 300

Asp Cys Leu
305
```

<210> SEQ ID NO 85
<211> LENGTH: 307
<212> TYPE: PRT
<213> ORGANISM: Artificial Sequence
<220> FEATURE:
<223> OTHER INFORMATION: wex L79P

<400> SEQUENCE: 85

```
Met Asn Ser Lys Lys Ala Thr Leu Ile Gly Leu Thr Ala Val Val Leu
1               5                   10                  15

Trp Ser Ser Ile Val Gly Leu Ile Arg Gly Val Ser Glu His Leu Gly
            20                  25                  30

Ala Thr Gly Gly Ala Ala Met Met Tyr Ser Val Ala Ser Leu Phe Leu
        35                  40                  45

Leu Leu Ser Val Gly Phe Pro Lys Leu Gly Ser Phe Pro Lys Lys Tyr
    50                  55                  60

Leu Leu Trp Gly Ser Leu Leu Phe Val Ser Tyr Glu Leu Cys Pro Ser
65                  70                  75                  80

Leu Ser Ile Gly Tyr Ala Asn Thr Gly Arg Gln Ala Ile Glu Val Ser
                85                  90                  95

Met Val Asn Tyr Leu Trp Pro Ala Phe Thr Leu Ile Ala Ala Ile Ala
            100                 105                 110

Phe Asn Arg Gln Arg Ala Asn Trp Met Val Val Pro Gly Phe Ile Leu
        115                 120                 125

Ser Ile Ile Gly Ile Cys Trp Val Leu Gly Gly Asp Gln Gly Leu Asp
    130                 135                 140

Leu Ala Gly Met Leu Gly Asn Val Gln Asp Asn Pro Leu Ser Tyr Gly
145                 150                 155                 160

Leu Ala Phe Leu Gly Ala Val Ile Trp Ala Ala Tyr Cys Thr Val Thr
                165                 170                 175

Ala Arg Leu Ala Lys Gly Lys Asn Gly Val Thr Leu Phe Phe Ile Leu
            180                 185                 190

Val Ala Leu Thr Leu Trp Val Lys Phe Phe Phe Gly Asp His Arg Pro
        195                 200                 205

Met Ser Phe Ser Leu Pro Ala Ile Val Tyr Leu Leu Leu Ala Ala Ala
```

-continued

```
    210                 215                 220

Ala Met Gly Phe Gly Tyr Ala Ala Trp Asn Val Gly Ile Leu His Gly
225                 230                 235                 240

Asn Val Thr Val Leu Ala Gly Val Ser Tyr Phe Ile Pro Val Phe Ser
                245                 250                 255

Ala Ala Leu Ser Ala Met Val Leu His Ala Pro Leu Pro Arg Ser Phe
            260                 265                 270

Trp Val Gly Ala Ser Leu Val Cys Ala Gly Ser Ile Leu Cys Trp Leu
        275                 280                 285

Ala Thr Arg Ala Arg Arg Ala Ser Ala Ala Gln Glu Asp Ala Val Ala
    290                 295                 300

Asp Cys Leu
305
```

L-TYROSINE-EXPORTING PROTEIN VARIANT AND METHOD FOR PRODUCING L-TYROSINE USING THE SAME

CROSS-REFERENCE TO RELATED APPLICATIONS

This application is a U.S. National Phase Application of PCT International Application No. PCT/KR2021/006621, filed on May 27, 2021, designating the United States of America, which is an International Application of and claims the benefit of priority to Korean Patent Application No. 10-2020-0063778, filed on May 27, 2020, the entire contents of which are incorporated herein by reference.

SEQUENCE LISTING STATEMENT

The present application contains a Sequence Listing, which is being submitted via EFS-Web on even date herewith. The Sequence Listing is submitted in a file entitled "Sequence_Listing_HAN030-017APC.txt," which was created on Nov. 23, 2022, and is approximately 47,919 bytes in size, and further updated by a file entitled "2023-04-27_Sequence_Listing_HAN030-017APC.txt," which was created on Apr. 27, 2023, and is approximately 49,246 bytes in size. This Sequence Listing is hereby incorporated by reference.

TECHNICAL FIELD

The present application relates to a novel protein variant having an L-tyrosine exporting activity, a microorganism for producing L-tyrosine including the protein variant, and a method for producing L-tyrosine using the microorganism.

BACKGROUND ART

L-Tyrosine is an amino acid and is used as an important material for pharmaceutical raw materials, food additives, animal feed, nutritional supplements, etc. In order to produce L-tyrosine and other useful materials, various studies are underway to develop microorganisms with high-efficiency production and technologies for fermentation processes.

The production process of L-tyrosine by microorganisms starts with 3-deoxy-D-arobino-heptulosonate-7-phosphate (DAHP) produced by the polymerization reaction of phosphoenolpyruvate (PEP), which is an intermediate of glycolysis, with erythrose-4-phosphate (E4P), which is an intermediate of the pentose phosphate pathway. Then, DAHP is biosynthesized from chorismate to prephenate through the common aromatic biosynthetic pathway and is finally converted to L-tyrosine through the L-tyrosine biosynthetic pathway.

Meanwhile, the expression of a gene capable of exporting a particular amino acid has contributed to an increase in productivity of the corresponding amino acid in microorganisms. The enhancement of the L-lysine-exporting gene (lysE) in a microorganism of the genus *Corynebacterium* has improved the productivity of lysine (U.S. Pat. No. 6,858,406 B1). Additionally, the enhancement of the rhtC gene in *E. coli* has improved the resistance to L-threonine, and simultaneously has also improved the productivity of L-homoserine, L-threonine, and L-leucine (EP 1013765 A1). EP 1016710 B1 discloses the improvement of the productivity of L-glutamic acid, L-lysine, L-threonine, L-alanine, L-histidine, L-proline, L-arginine, L-valine, and L-isoleucine by enhancing yahN, yeaS, yfiK, and yggA genes, whose functions are not yet identified in *E. coli*.

DISCLOSURE

Technical Problem

However, no exporting protein showing specificity to L-tyrosine has yet been reported. Although the yddG gene of *E. coli* is known as an exporter protein of aromatic amino acids, it shows higher specificity to L-phenylalanine than to L-tyrosine or L-tryptophan (*FEMS Microbiol Lett* 275 (2007) 312-318). Additionally, in a microorganism of the genus *Corynebacterium* which is mainly used as a strain producing L-amino acid fermentation, no protein that can export L-tyrosine or an aromatic amino acid has been reported (*J Ind Microbiol Biotechnol.* 2015 May; 42(5):787-97).

Technical Solution

It is one object of the present application to provide a protein variant, in which the $79^{th}$ amino acid from the N-terminus in the amino acid sequence of SEQ ID NO: 52 is substituted with alanine or glycine; a polynucleotide encoding the same; and a vector containing the polynucleotide.

It is another object of the present application to provide a microorganism for producing L-tyrosine, including one or more of the protein variant; a polynucleotide encoding the same; and a vector containing the polynucleotide.

It is still another object of the present application to provide a method for producing L-tyrosine, including: culturing the microorganism.

It is yet another object of the present application to provide a composition for producing L-tyrosine, including any one or more of the protein variant; the polynucleotide; the vector; and the microorganism.

Advantageous Effects

The microorganism expressing the protein variant of the present application can dramatically improve the production of L-tyrosine compared to the parent strain that does not express the protein variant, and thus can effectively produce L-tyrosine using the protein variant.

DETAILED DESCRIPTION OF PREFERRED EMBODIMENTS

Hereinafter, the present application will be described in detail. Meanwhile, each description and embodiment disclosed herein can be applied to other descriptions and embodiments, respectively. That is, all combinations of various elements disclosed herein fall within the scope of the present application. Further, the scope of the present application is not limited by the specific description described below.

Additionally, those of ordinary skill in the art may be able to recognize or confirm, using only conventional experimentation, many equivalents to the particular aspects of the invention described herein. Furthermore, it is also intended that these equivalents be included in the present application.

In addition, a number of papers and patent documents have been referenced and cited throughout the present specification. The content of the cited papers and patent documents is incorporated herein by reference in their entirety, and the level of technical field to which the present invention belongs and the contents of the present invention will be described more clearly.

One aspect of the present application provides a protein variant having an L-tyrosine exporting activity, in which one or more amino acids in the amino acid sequence of SEQ ID NO: 52 is substituted with another amino acid.

The protein variant may be a protein variant having an L-tyrosine exporting activity, in which the $79^{th}$ amino acid from the N-terminus in the amino acid sequence of SEQ ID NO: 52 is substituted with another amino acid.

As used herein, the term "L-tyrosine" refers to one of the 20 α-amino acids, and is classified as a polar amino acid or an aromatic amino acid. Tyrosine is a commercially critical amino acid used as a precursor of pharmaceuticals, flavonoids, alkaloids, etc.

In the present application, the "protein having an L-tyrosine exporting activity" may be a protein having an activity capable of specifically exporting L-tyrosine out of a cell.

The protein having an L-tyrosine exporting activity of the present application may be derived from a protein having an L-tyrosine exporting ability derived from *Herbaspirillum rhizosphaerae*, but is not limited thereto.

In particular, the "*Herbaspirillum rhizosphaerae*" is a gram-negative bacterium belonging to the genus *Herbaspirillum*. In Korea, it can be isolated from the rhizosphere in the soil, as a strain isolated from Ulleung island, etc.

Although the protein having an L-tyrosine exporting activity derived from *Herbaspirillum rhizosphaerae* may be, for example, a protein including the amino acid sequence of SEQ ID NO: 52, it is apparent that any sequence having the same activity as the amino acid sequence of SEQ ID NO: 52, in which the sequence corresponding to the $79^{th}$ position of SEQ ID NO: 52 is substituted with another amino acid of the present application other than the wild-type sequence, thereby having the ability to export L-tyrosine, is within the scope of the present application without limitation on its origin as a target protein having an amino acid mutation of the residue corresponding to the 79th position. The protein including the amino acid sequence of SEQ ID NO: 52 may be used interchangeably with a protein having the amino acid sequence of SEQ ID NO: 52 and a protein consisting of the amino acid sequence of SEQ ID NO: 52.

Specifically, the protein having an L-tyrosine exporting activity of the present application may be a variant of the protein including the amino acid sequence of SEQ ID NO: 52.

The protein including the amino acid sequence of SEQ ID NO: 52 is a protein having an L-tryptophan exporting activity, and it has been newly identified in the present application that the variant in which the amino acid corresponding to the $79^{th}$ position is mutated has an L-tyrosine exporting activity.

In the present application, the protein including the amino acid sequence of SEQ ID NO: 52 is a representative example among the proteins into which a mutation can be introduced, and it does not exclude an addition of a sequence upstream or downstream of the amino acid sequence of SEQ ID NO: 52, a mutation that may occur naturally, or a silent mutation thereof, and when the protein has an activity identical or corresponding to the protein including the amino acid sequence of SEQ ID NO: 52, the protein belongs to the proteins into which a mutation can be introduced in the present application.

For example, the protein into which a mutation can be introduced in the present application may be a protein consisting of the amino acid sequence of SEQ ID NO: 52, or an amino acid sequence having a homology to the amino acid sequence of SEQ ID NO: 52 of 80%, 90%, 95%, 97%, or higher. Additionally, it is apparent that any protein having an amino acid sequence with deletion, modification, substitution, or addition in part of the sequence can also belong to the scope of the protein targeted for mutation of the present application as long as the protein has an amino acid sequence with any of the above homologies and identities, and exhibits an effect corresponding to the above protein.

That is, in the present application, although it is described as "a protein or polypeptide having an amino acid sequence of a particular SEQ ID NO" or "a protein or polypeptide including an amino acid sequence of a particular SEQ ID NO", it is apparent that any protein which has deletion, modification, substitution, or addition in part of the amino acid sequence may also be used in the present application, as long as the protein has the same or corresponding activity to the polypeptide composed of the amino acid sequence of the corresponding SEQ ID NO. For example, it is apparent that the "protein composed of the amino acid sequence of SEQ ID NO: 52" may fall within the "protein including the amino acid sequence of SEQ ID NO: 52" as long as the protein has the same or corresponding activity.

As used herein, the term "variant" refers to a protein having one or more amino acids different from the recited sequence by conservative substitutions and/or modifications such that the functions and properties of the protein are retained. The variants are different from the sequences identified by substitution, deletion or addition of several amino acids. Such variants may generally be identified by modifying one or more of the above amino acid sequences of the protein and evaluating the properties of the modified protein. That is, the ability of the variants may be enhanced, unchanged, or reduced relative to a native protein. In addition, some variants may include variants in which one or more parts, such as an N-terminal leader sequence or a transmembrane domain, are removed. Further, some variants may include those in which one or more portions are removed from the N- and/or C-terminus of a mature protein. The term "variant" may be used interchangeably with terms such as modification, modified protein, modified polypeptide, mutant, mutein, divergent, variant, etc. without limitation, as long as the terms are used to indicate mutation. For the purpose of the present application, the variant may be those in which the activity of the protein is enhanced compared to that of a native wild-type or non-modified protein, but is not limited thereto.

As used herein, the term "conservative substitution" refers to substitution of an amino acid with another amino acid having similar structural and/or chemical properties. The variant may have, for example, one or more conservative substitutions while still retaining one or more biological activities. Such amino acid substitution may generally occur based on similarity of polarity, charge, solubility, hydrophobicity, hydrophilicity, and/or amphipathic nature of a residue.

For example, among the amino acids having an electrically-charged side chain, positively charged (basic) amino acids include arginine, lysine, and histidine; negatively charged (acidic) amino acids include glutamic acid and aspartic acid; and amino acids having uncharged side chain include glycine, alanine, valine, leucine, isoleucine, methionine, phenylalanine, tryptophan, proline, serine, threonine, cysteine, tyrosine, asparagine, and glutamine.

Additionally, the variant may also include deletion or addition of amino acids that have minimal influence on the properties and secondary structure of a polypeptide. For example, the polypeptide may be conjugated with a signal (or leader) sequence at the N-terminus involved in the transfer of proteins co-translationally or post-translationally. Further, the polypeptide may also be conjugated with another sequence or linker to identify, purify, or synthesize the polypeptide.

The protein variant having an L-tyrosine exporting activity provided by the present application may refer to a variant in which, among the proteins described above, an amino acid at a specific position or a corresponding thereto is substituted with another amino acid, and the resulting L-tyrosine exporting ability of the protein exceeds 100% compared to that of the protein before mutation.

In the present application, the "substitution with another amino acid" is not limited as long as it is substituted with an amino acid other than the amino acid before substitution. That is, the expression that leucine, which is the 79$^{th}$ amino acid from the N-terminus of the amino acid sequence of SEQ ID NO: 52, is substituted with "an amino acid other than leucine" may be expressed as "the 79$^{th}$ amino acid from the N-terminus of the amino acid sequence of SEQ ID NO: 52 is substituted with another amino acid". Meanwhile, in the present application, when it is expressed that 'a specific amino acid has been substituted', it is apparent that the amino acid is substituted with an amino acid different from the amino acid before substitution, even if it is not specifically stated that the amino acid has been substituted with a different amino acid.

The protein variant of the present application may be a variant in which the 79th amino acid is substituted with another amino acid from the N-terminus of the amino acid sequence of SEQ ID NO: 52, but is not limited thereto.

Specifically, the protein variant of the present application may be a variant in which the 79$^{th}$ amino acid from the N-terminus of the amino acid sequence of SEQ ID NO: 52 is substituted with alanine, glycine, isoleucine, methionine, serine, proline, threonine, tyrosine, asparagine, arginine, or tryptophan, but is not limited thereto.

Specifically, the protein variant of the present application may be a variant in which the 79$^{th}$ amino acid from the N-terminus of the amino acid sequence of SEQ ID NO: 52 is substituted with alanine, glycine, isoleucine, methionine, threonine, tyrosine, asparagine, arginine, or tryptophan, but is not limited thereto. Specifically, the protein variant of the present application may be a variant in which the 79$^{th}$ amino acid from the N-terminus of the amino acid sequence of SEQ ID NO: 52 is substituted with alanine or glycine, but is not limited thereto.

Such a protein variant of the present application has an enhanced L-tyrosine exporting ability compared to the protein before mutation.

It is apparent that the protein variant, in which the amino acid at position 79 from the N-terminus of the amino acid sequence of SEQ ID NO: 52 of the present application is substituted with another amino acid, may include protein variants, in which the amino acid corresponding to position 79 from the N-terminus of the amino acid sequence of SEQ ID NO: 52 is substituted with another amino acid, although the position is described as a different position other than the position 79 by deletion/addition/insertion of the N- or C-terminus of the amino acid sequence of SEQ ID NO: 52, or an intermediate amino acid, etc.

In addition, although in the present application, the protein variant, in which the 79$^{th}$ amino acid from the N-terminus of SEQ ID NO: 52 is substituted with another amino acid, has been described as a protein having an L-tyrosine exporting activity, the protein variant having an L-tyrosine exporting activity of the present application is not limited to the variant of SEQ ID NO: 52, and it is apparent that variants having an L-tyrosine exporting activity by substituting "the amino acid corresponding to position 79 from the N-terminus of the amino acid sequence of SEQ ID NO: 52" with another amino acid, in any amino acid sequence having the same activity to the amino acid sequence of SEQ ID NO: 52 or L-tyrosine exporting activity, also fall within the scope of the protein variants of the present application.

The "amino acid corresponding to position 79 from the N-terminus of the amino acid sequence of SEQ ID NO: 52" in any amino acid sequence can be identified through various sequence alignment methods known in the art.

The protein variant, in which the amino acid at position 79 from the N-terminus of the amino acid sequence of SEQ ID NO: 52 of the present application is substituted with another amino acid, may be a protein which includes the amino acid sequence of SEQ ID NO: 52 or an amino acid sequence having a homology or identity of 80%, 85%, 90%, 95%, 96%, 97%, 98%, or 99% or higher thereto and in which the amino acid corresponding to position 79 from the N-terminus of the amino acid sequence of SEQ ID NO: 52 is substituted with another amino acid.

The protein variant of the present application may include the amino acid sequence of any one of SEQ ID NO: 1, SEQ ID NO: 2, and SEQ ID NOS: 77 to 85. Specifically, it may be one consisting essentially of the amino acid sequence of any one of SEQ ID NO: 1, SEQ ID NO: 2, and SEQ ID NOS: 77 to 85, and more specifically, it may consist of any one of the amino acid sequences of SEQ ID NO: 1, SEQ ID NO: 2, and SEQ ID NOS: 77 to 85. In one embodiment, the protein variant of the present application may consist of any one of the amino acid sequences of SEQ ID NO: 1, SEQ ID NO: 2, and SEQ ID NOS: 77 to 83, and in another embodiment, the protein variant of the present application may consist of the amino acid sequence of SEQ ID NO: 1 or SEQ ID NO: 2, but is not limited thereto.

The protein variant of the present application may include any one of the amino acid sequences of SEQ ID NO: 1, SEQ ID NO: 2, SEQ ID NO: 77, SEQ ID NO: 78, SEQ ID NO: 79, SEQ ID NO: 80, SEQ ID NO: 81, SEQ ID NO: 82, SEQ ID NO: 83, SEQ ID NO: 84, and SEQ ID NO: 85. The protein variant of the present application may include any one of the amino acid sequences of SEQ ID NOS: 1, 2, and SEQ ID NOS: 77 to 83. The protein variant of the present application may include the amino acid sequence of SEQ ID NO: 1 or 2, but is not limited thereto.

Meanwhile, the protein variant of the present application may consist essentially of the amino acid sequence of the above-mentioned SEQ ID NO or may consist of the amino acid sequence of the above-mentioned SEQ ID NO, but is not limited thereto.

Additionally, the protein variant may include any amino acid sequence, in which the 79$^{th}$ amino acid in the any one of the amino acid sequences of SEQ ID NO: 1, SEQ ID NO: 2 and SEQ ID NOS: 77 to 85 is fixed and which has a homology or identity of at least 80%, 90%, 95%, 96%, 97%, 98%, or 99% thereto, but the protein variant is not limited thereto. Additionally, it is apparent that any protein, which has an amino acid sequence with deletion, modification, substitution, or addition in part of the sequence other than the amino acid at positions 79, can also be included within the scope of the present application, as long as the amino acid sequence has any of the above homologies or identities and exhibits an effect corresponding to the protein variant above.

As used herein, the term "homology" or "identity" refers to a degree of relevance between two given amino acid sequences or nucleotide sequences, and may be expressed as a percentage.

The terms homology and identity may often be used interchangeably with each other.

The sequence homology or identity of conserved polynucleotides or polypeptides may be determined by standard alignment algorithms and can be used with a default gap penalty established by the program being used. Substantially, homologous or identical sequences may hybridize under moderately or highly stringent conditions such that the full length of the sequence or at least about 50%, 60%, 70%, 80%, or 90% or more of the full-length may hybridize. Polynucleotides that contain degenerate codons instead of codons in hybridizing polynucleotides are also considered.

The homology or identity of the polypeptide or polynucleotide sequences may be determined by, for example, BLAST algorithm by literature (Karlin and Altschul, Pro. Natl. Acad. Sci. USA, 90, 5873 (1993)), or FASTA by Pearson (Methods Enzymol., 183, 63, 1990). Based on the algorithm BLAST, a program referred to as BLASTN or BLASTX has been developed. Further, whether any amino acid or polynucleotide sequences have a homology, similarity, or identity with each other, it may be identified by comparing the sequences in a Southern hybridization experiment under stringent conditions as defined, and appropriate hybridization conditions defined are within the skill of the art, and may be determined by a method well known to those skilled in the art (e.g., J. Sambrook et al., *Molecular Cloning, A Laboratory Manual,* 2nd Edition, Cold Spring Harbor Laboratory press, Cold Spring Harbor, New York, 1989; F. M. Ausubel et al., *Current Protocols in Molecular Biology*).

Another aspect of the present application provides a polynucleotide encoding the protein variant.

As used herein, the "polynucleotide", which is a polymer of nucleotides composed of nucleotide monomers connected in a lengthy chain by a covalently bond, is a DNA or RNA strand having at least a certain length. More specifically, it may refer to a polynucleotide fragment encoding the protein variant.

The polynucleotide encoding the protein variant of the present application may be included without limitation as long as it is a polynucleotide sequence encoding a protein variant having an L-tyrosine exporting ability.

In the present application, the gene encoding the amino acid sequence of the protein targeted for mutation may be wex gene and may be derived from *Herbaspirillum rhizosphaerae*, and specifically, it may be a nucleotide sequence encoding the amino acid sequence of SEQ ID NO: 52, but is not limited thereto.

In addition, the polynucleotide encoding the protein variant of the present application may undergo various modifications in the coding region within the scope that does not change the amino acid sequence of the polypeptide, due to codon degeneracy or in consideration of the codons preferred in an organism in which the protein variant is to be expressed. Specifically, any polynucleotide sequence encoding the protein variant, in which the $79^{th}$ amino acid in the amino acid sequence of SEQ ID NO: 52 is substituted with another amino acid, may be included without limitation.

For example, the polynucleotide of the present application may be the protein variant of the present application, specifically a protein including any one of the amino acid sequences of SEQ ID NO: 1, SEQ ID NO: 2, SEQ ID NOS: 77 to 85, or a polynucleotide sequence encoding a protein having a homology or identity thereto, but is not limited thereto. The homology and identity are as described above.

Further, the polynucleotide encoding the protein variant may include a probe that may be prepared from a known gene sequence, for example, any sequence encoding the protein variant, in which the $79^{th}$ amino acid in the amino acid sequence of SEQ ID NO: 52 is substituted with another amino acid, by hybridizing with a sequence complementary to all or part of the polynucleotide sequence under stringent conditions without limitation.

The "stringent conditions" refers to conditions under which specific hybridization between polynucleotides is allowed. Such conditions are specifically described in the literature (J. Sambrook et al., supra). For example, the stringent conditions may include conditions under which genes having a high homology or identity of 40% or more, specifically 90% or more, more, specifically 95% or more, even more specifically 97% or more, still more specifically 99% or more are hybridized with each other and genes having a homology or identity lower than the above homologies or identities are not hybridized with each other, or washing conditions of Southern hybridization, that is, washing once, specifically, twice or three times at a salt concentration and a temperature corresponding to 60° C., 1×SSC, 0.1% SDS, specifically 60° C., 0.1×SSC, 0.1% SDS, and more specifically 68° C., 0.1×SSC, 0.1% SDS. However, the conditions are not limited thereto and may be appropriately adjusted by those skilled in the art depending on the purpose.

Hybridization requires that two polynucleotides contain complementary sequences, although mismatches between bases are possible depending on the stringency of the hybridization. The term "complementary" is used to describe the relationship between nucleotide bases that can hybridize with each other. For example, with respect to DNA, adenine is complementary to thymine, and cytosine is complementary to guanine. Therefore, the present application may include isolated polynucleotide fragments complementary to the entire sequence as well as polynucleotide sequences substantially similar thereto.

Specifically, polynucleotides having a homology may be detected using the hybridization conditions including a hybridization step at a $T_m$ value of 55° C. under the above-described conditions. Further, the $T_m$ value may be 60° C., 63° C., or 65° C., but is not limited thereto, and may be appropriately adjusted by those skilled in the art depending on the purpose thereof.

The appropriate stringency for hybridizing the polynucleotides depends on the length of the polynucleotides and the degree of complementation, and these variables are well known in the art (e.g., Sambrook et al., supra, 9.50-9.51, 11.7-11.8).

Still another aspect of the present application provides a vector containing a polynucleotide encoding the protein variant.

As used herein, the term "vector" refers to a DNA construct containing the nucleotide sequence of a polynucleotide encoding the target protein operably linked to a suitable expression regulatory sequence so as to be able to express the target protein in a suitable host cell. The expression regulatory sequence may include a promoter capable of initiating transcription, any operator sequence for regulating the transcription, a sequence encoding a suitable mRNA ribosome binding site, and a sequence for regulating termination of transcription and translation. Once transformed into a suitable host cell, the vector may replicate or function independently from the host genome, or may integrate into genome thereof.

The vector used in the present application is not particularly limited, and any vector known in the art may be used. Examples of the vector typically used may include natural or recombinant plasmids, cosmids, viruses, and bacteriophages. For example, as a phage vector or cosmid vector, pWE15, M13, MBL3, MBL4, IXII, ASHII, APII, t10, t11, Charon4A and Charon21A, etc. may be used; and as a plasmid vector, those based on pBR, pUC, pBluescriptII, pGEM, pTZ, pCL and pET, etc. may be used. Specifically, pDZ, pACYC177, pACYC184, pCL, pECCG117, pUC19, pBR322, pMW118, or pCC1 BAC vector may be used.

In one example, a polynucleotide encoding a target protein in the chromosome may be replaced with a modified polynucleotide through a vector for intracellular chromosomal insertion. The insertion of the polynucleotide into the chromosome may be performed by any method known in the art, for example, by homologous recombination, but is not limited thereto. The vector may further include a selection marker to confirm the insertion into the chromosome. The selection marker is for selecting the cells transformed with the vector, that is, for confirming whether the target nucleic acid molecule has been inserted, and markers that provide selectable phenotypes, such as drug resistance, auxotrophy, resistance to cell toxic agents, or expression of surface proteins, may be used. Only cells expressing the selection marker are able to survive or to show different phenotypes under the environment treated with the selective agent, and thus the transformed cells may be selected.

Yet another aspect of the present application provides a microorganism for producing L-tyrosine, including any one or more of the protein variant; a polynucleotide encoding the same; and a vector containing the polynucleotide.

The microorganism for producing L-tyrosine may be a microorganism having an enhanced L-tyrosine producing ability, including any one or more of the protein variant; a polynucleotide encoding the same; and a vector containing the polynucleotide, compared to a microorganism including a wild-type SEQ ID NO: 52.

The microorganism including any one or more of the protein variant; a polynucleotide encoding the same; and a vector containing the polynucleotide may be a microorganism in which an L-tyrosine producing ability has been imparted, but is not limited thereto.

As used herein, the term "microorganism for producing L-tyrosine" or "microorganism having an L-tyrosine producing ability" may be a microorganism having the ability to naturally produce tyrosine or a microorganism in which the tyrosine producing ability is imparted to a parent strain that does not have the ability to produce tyrosine.

The microorganism may be a microorganism which can produce L-tyrosine from carbon sources in a medium in an excess amount compared to that of a wild-type or non-modified microorganism. Additionally, the microorganism for producing L-tyrosine may be a recombinant microorganism. Specifically, the microorganism may be a microorganism of the genus *Enterobacter*, a microorganism of the genus *Escherichia*, a microorganism of the genus *Erwinia*, a microorganism of the genus *Serratia*, a microorganism of the genus *Providencia*, a microorganism of the genus *Corynebacterium*, or a microorganism of the genus *Brevibacterium*, but the type of the microorganism is not particularly limited as long as the microorganism produces L-tyrosine. More specifically, the microorganism may be a microorganism of the genus *Corynebacterium* or a microorganism of the genus *Escherichia*. More specifically, the microorganism may be a microorganism of the genus *Corynebacterium*, for example, *Corynebacterium glutamicum*, but is not limited thereto.

Even more specifically, the microorganism of the genus *Escherichia* may be *Escherichia coli*, and the microorganism of the genus *Corynebacterium* may be *Corynebacterium glutamicum*, but any microorganism of the genus *Escherichia* or the genus *Corynebacterium*, in which a protein having an L-tyrosine exporting activity is introduced or the activity is enhanced and thus the amount of L-tyrosine production can be increased, may be included without limitation.

The microorganism that can produce L-tyrosine by including the protein variant of the present application; a polynucleotide encoding the same; and a vector containing the polynucleotide may be a microorganism expressing the protein variant of the present application.

As used herein, the term "to be expressed/expressing" of a protein refers to a state in which a target protein is introduced into a microorganism or a target protein is modified to be expressed in a microorganism. When the target protein is a protein present in a microorganism, the term refers to a state in which the activity of the protein is enhanced compared to the activity of its endogenous protein or that before its modification.

The microorganism expressing the protein variant of the present application may be a microorganism which has been modified to express the protein variant, and accordingly, even another aspect of the present application provides a method for producing the microorganism expressing the protein variant of the present application.

The purpose of the present application, the "target protein" may be a protein variant having an L-tyrosine exporting activity described above.

Specifically, the term "introduction of a protein" means that a microorganism exhibits an activity of a particular protein which was not originally possessed by the microorganism, or the microorganism exhibits enhanced activity compared to its endogenous activity or the activity of the protein before modification. For example, it may mean that a polynucleotide encoding a particular protein is introduced into the chromosome of a microorganism; or a vector containing a polynucleotide encoding a particular protein is introduced into a microorganism and thereby allows the activity of the particular protein to be exhibited. Additionally, the term "enhancement of activity" means that the activity of a particular protein possessed by a microorganism is enhanced compared to its endogenous activity or the activity before its modification. The term "endogenous activity" refers to the activity of a particular protein originally possessed by a parent strain before modification, in a case where the trait of the microorganism is altered due to genetic mutation caused by a natural or artificial factor.

Specifically, the enhancement of an activity of the present application may be achieved by one or more methods selected from the group consisting of: a method for increasing the intracellular copy number of a gene encoding the protein variant; a method for introducing a mutation to the expression control sequence of a gene encoding the protein variant; a method for replacing the expression control sequence of a gene encoding the protein variant having an L-tyrosine exporting activity with a sequence having a strong activity; a method for replacing a gene encoding a native protein having an L-tyrosine exporting activity on the chromosome with a gene encoding the protein variant; a method for further introducing a mutation to a gene encoding the protein such that the activity of the protein variant is enhanced; and a method for introducing a protein variant into a microorganism, but the method for enhancing an activity is not limited thereto.

In the above, the method for increasing the copy number of a gene may be performed in a form where the gene is operably linked to a vector or by inserting the gene into the chromosome of a host cell, but the method is not particularly limited thereto. Specifically, the copy number of a gene may be increased by introducing a vector into a host cell, where the vector, to which a polynucleotide encoding the protein of the present application is operably linked and which can replicate and function regardless of the host cell, is introduced into the host cell. Alternatively, the copy number of a gene may be increased by introducing the vector, to which a polynucleotide is operably linked and which can insert the polynucleotide into the chromosome of a host cell, into the chromosome of the host cell. The insertion of a polynucleotide into the chromosome may be achieved by a method known in the art, for example, homologous recombination.

Then, the modification of the expression control sequence for increasing the expression of a polynucleotide may be performed by inducing a mutation in the sequence of a nucleic acid by deletion, insertion, non-conservative or conservative substitution, or a combination thereof so as to further enhance the activity of the expression control sequence; or by replacing the expression control sequence with a nucleic acid sequence with a stronger activity, but the method of modification of the expression control sequence is not particularly limited thereto. The expression control sequence may include a promoter, an operator sequence, a sequence encoding a ribosome binding site, sequences controlling the termination of transcription and translation, etc., but the expression control sequence is not particularly limited thereto.

A strong promoter may be linked to an upstream region of the expression unit of the polynucleotide instead of the original promoter, but is not limited thereto. Examples of the strong promoter known in the art may include cj1 to cj7 promoters (KR Patent No. 10-0620092), a lac promoter, a trp promoter, a trc promoter, a tac promoter, a lambda phage PR promoter, a $P_L$ promoter, a tet promoter, a gapA promoter, a SPL7 promoter, a SPL13 (sm3) promoter (KR Patent No. 10-1783170), an O2 promoter (KR Patent No. 10-1632642), a tkt promoter, an yccA promoter, etc., but the strong promoter is not limited thereto.

Further, the modification of a polynucleotide sequence on the chromosome may be performed by inducing a mutation on the expression control sequence by deletion, insertion, non-conservative or conservative substitution, or a combination thereof so as to further enhance the activity of the polynucleotide sequence; or by replacing the polynucleotide sequence with a polynucleotide sequence improved to have a stronger activity, but the modification method of the polynucleotide sequence is not particularly limited thereto.

The introduction and enhancement of a protein activity as described above may generally increase the activity or concentration of the corresponding protein by at least 1%, 10%, 25%, 50%, 75%, 100%, 150%, 200%, 300%, 400%, or 500%, and at most 1,000% or 2,000%, based on the activity or concentration of the protein in a wild-type or non-modified microorganism strain, but the range of increase is not limited thereto.

As used herein, the term "non-modified strain" does not exclude a strain containing a mutation that may occur naturally in a microorganism, and may refer to a natural-type strain itself, or a strain before the trait is altered due to genetic modification caused by natural or artificial factors. The "non-modified strain" may be used interchangeably with "non-mutant strain", "strain before modification", "microorganism before modification", "non-mutant microorganism", "non-modified microorganism", or "reference microorganism". In one embodiment, the non-modified microorganism may be a strain that does not include the protein variant having an L-tyrosine exporting activity of the present application.

The microorganism of the present application may be a native microorganism itself having a tyrosine producing ability, a microorganism in which the activity of a gene involved in the tyrosine production mechanism is enhanced or inactivated so as to have an improved tyrosine producing ability, or a microorganism in which the activity of a foreign gene is introduced or enhanced so as to have an improved tyrosine producing ability.

In order to impart an L-tyrosine producing ability to the microorganism of the present application or to increase the production ability, a modification for continuous supply of precursors (e.g., erythrose-4-phosphate; E4P) and efficient energy utilization, a method of increasing L-tyrosine biosynthesis by blocking branched pathways in the L-tyrosine biosynthesis pathway, or a modification of utilizing a lesser amount of ATP, etc. may be used.

Specifically, in the present application, the parent strain of the L-tyrosine-producing microorganism, which is modified so that the protein variant having an L-tyrosine exporting activity can be expressed, is not particularly limited as long as it is an L-tyrosine-producing microorganism. The L-tyrosine-producing microorganism may be a microorganism in which the activity of a gene in a competitive pathway, a regulator in a directional pathway of an L-tyrosine operon, a gene for importing L-tyrosine, or a gene for importing and decomposing L-tyrosine is weakened or inactivated, so as to enhance the L-tyrosine biosynthesis pathway; and/or may be a microorganism in which the activity of an L-tyrosine operon is regulated.

For example, for the microbial modification, the activity of an aromatic amino acid-importing protein may be attenuated or removed compared to its endogenous activity (e.g., attenuation/removal of aroP activity), and feedback can be released by introducing a mutation into a gene encoding a protein involved in feedback regulation (e.g., tyrA, aroG). In addition, the expression of a gene encoding a protein involved in precursor supply (e.g., tkt gene) may be enhanced. Additionally, the activity of a gene (e.g., pheA) in a competitive pathway may be attenuated, removed, or altered (e.g., L-tryptophan concentration-dependent alteration) compared to its endogenous activity, but is not limited thereto.

Even another aspect of the present application provides a method for producing L-tyrosine, including: culturing a microorganism expressing the protein variant having an L-tyrosine exporting activity of the present application in medium.

The protein variant, expression of protein, and microorganism are the same as described above.

As used herein, the term "cultivation" means that the microorganism is grown under appropriately controlled environmental conditions. The cultivation process of the present application may be performed in a suitable culture medium and culture conditions known in the art. Such a cultivation process may be easily adjusted for use by those skilled in the art according to the strain to be selected. Specifically, the cultivation may be a batch culture, a continuous culture, and a fed-batch culture, but is not limited thereto.

As used herein, the term "medium" refers to a mixture of materials which contains nutrient materials required for the cultivation of the microorganism as a main ingredient, and it supplies nutrient materials and growth factors, along with water that is essential for survival and growth. Specifically, the medium and other culture conditions used for culturing the microorganism of the present application may be any medium used for conventional cultivation of microorganisms without any particular limitation. However, the microorganism of the present application may be cultured under aerobic conditions in a conventional medium containing an appropriate carbon source, nitrogen source, phosphorus source, inorganic compound, amino acid, and/or vitamin, while adjusting temperature, pH, etc.

In the present application, the carbon source may include carbohydrates, such as glucose, fructose, sucrose, maltose, etc.; sugar alcohols, such as mannitol, sorbitol, etc.; organic acids, such as pyruvic acid, lactic acid, citric acid, etc.; amino acids, such as glutamic acid, methionine, lysine, etc. Additionally, the carbon source may include natural organic nutrients such as starch hydrolysate, molasses, blackstrap molasses, rice bran, cassava, sugar cane molasses, and corn steep liquor, etc. Specifically, carbohydrates such as glucose and sterilized pretreated molasses (i.e., molasses converted to reducing sugar) may be used, and in addition, various other carbon sources in an appropriate amount may be used without limitation. These carbon sources may be used alone or in a combination of two or more kinds, but are not limited thereto.

The nitrogen source may include inorganic nitrogen sources, such as ammonia, ammonium sulfate, ammonium chloride, ammonium acetate, ammonium phosphate, ammonium carbonate, ammonium nitrate, etc.; amino acids, such as glutamic acid, methionine, glutamine, etc.; and organic nitrogen sources, such as peptone, NZ-amine, meat extract, yeast extract, malt extract, corn steep liquor, casein hydrolysate, fish or decomposition product thereof, defatted soybean cake or decomposition product thereof, etc. These nitrogen sources may be used alone or in a combination of two or more kinds, but are not limited thereto.

The phosphorus source may include monopotassium phosphate, dipotassium phosphate, or corresponding sodium-containing salts, etc. Examples of the inorganic compound may include sodium chloride, calcium chloride, iron chloride, magnesium sulfate, iron sulfate, manganese sulfate, calcium carbonate, etc. Additionally, amino acids, vitamins, and/or appropriate precursors may be included. These constituting ingredients or precursors may be added to a medium in a batch or continuous manner, but these phosphorus sources are not limited thereto.

In the present application, the pH of a medium may be adjusted during the cultivation of the microorganism by adding a compound such as ammonium hydroxide, potassium hydroxide, ammonia, phosphoric acid, sulfuric acid, etc. to the medium in an appropriate manner. Additionally, during the cultivation, an antifoaming agent such as fatty acid polyglycol ester may be added to prevent foam generation. In addition, oxygen or oxygen-containing gas may be injected into the medium in order to maintain an aerobic state of the medium; or nitrogen, hydrogen, or carbon dioxide gas may be injected or no gas may be injected in order to maintain an anaerobic or microaerobic state of the medium, but the gas is not limited thereto.

The medium temperature may be in a range from 20° C. to 50° C., and specifically from 30° C. to 37° C., but is not limited thereto. The cultivation may be continued until a desired production amount of useful substances is obtained, and specifically, the cultivation period may be 10 hours to 100 hours, but is not limited thereto.

The production method may further include recovering L-tyrosine from the medium or the microorganism according to the cultivation.

In the recovering of L-tyrosine, desired L-tyrosine may be collected using the method of culturing a microorganism of the present application, for example, using a suitable method known in the art according to a batch culture, continuous culture, or fed-batch culture method. For example, methods such as centrifugation, filtration, treatment with a protein crystallizing precipitant (salting-out method), extraction, ultrasonic disruption, ultrafiltration, dialysis, various kinds of chromatography such as molecular sieve chromatography (gel filtration), adsorption chromatography, ion exchange chromatography, affinity chromatography, etc., HPLC or a combination thereof may be used, but the method is not limited thereto.

The production method may include an additional purification process, which may be performed using an appropriate method known in the art, and the recovered L-tyrosine can be purified.

Further another aspect of the present application provides a composition for producing L-tyrosine, including any one or more of the protein variant; a polynucleotide encoding the same; a vector containing the polynucleotide; and a microorganism expressing the protein variant.

Still further another aspect of the present application provides a use of any one or more of the protein variant; a polynucleotide encoding the same; a vector containing the polynucleotide; and a microorganism expressing the protein variant in the production of L-tyrosine.

The protein variant, polynucleotide encoding the same, vector containing the same, and microorganism are the same as described above.

The composition of the present application may include additional constitution that can produce L-tyrosine using the protein variant; a polynucleotide encoding the same; a vector containing the polynucleotide; and a microorganism expressing the protein variant without limitation. For example, it may further include any suitable excipients or components of a medium commonly used in compositions for microbial fermentation, but is not limited thereto.

In the present specification, unless the context requires otherwise, the expressions "include", "including", "containing", etc. mean the inclusion of the specified integer or group of integers, but it should be understood that other integers or sets of integers are not excluded.

MODE FOR CARRYING OUT THE INVENTION

The present application will be described in detail by way of Examples and Experimental Examples. However, these Examples and Experimental Examples are given for illustrative purposes only, and the scope of the present application is not intended to be limited to or by these Examples and Experimental Examples.

Reference Example 1: Construction of L-Tyrosine-Producing Strain

Although the wild-type *Corynebacterium glutamicum* has the ability to produce L-tyrosine, it does not produce L-tyrosine in excess to be released into a cultured medium. According to the purpose of the present disclosure, in order to identify a genetic trait that increases the L-tyrosine producing ability, a strain with an increased L-tyrosine producing ability was used rather than the wild-type strain. Therefore, an L-tyrosine-producing strain was constructed by enhancing the genes necessary to produce L-tyrosine based on the *Corynebacterium glutamicum* ATCC 13869 strain.

First, for the enhanced supply of erythrose 4 phosphate (E4P) as a precursor of L-tyrosine, tkt genes were overexpressed. At the same time, aroP, an aromatic amino acid importer gene that introduces L-tyrosine into the cells, was deleted.

For the genetic manipulation, downstream and upstream regions of the aroPgene into which the tkt gene was to be inserted by substitution were first obtained. Specifically, a gene fragment in the downstream region of the aroP gene was obtained using the primers of SEQ ID NO: 3 and SEQ ID NO: 4, and a gene fragment in the upstream region of the aroP gene was obtained using the primers of SEQ ID NO: 5 and SEQ ID NO: 6 based on the *Corynebacterium glutamicum* ATCC13869 chromosomal DNA as a template through PCR. Solg™ Pfu-X DNA polymerase was used as the polymerase, and the PCR was performed under PCR amplification conditions of denaturation at 95° C. for 5 minutes, followed by 30 cycles of denaturation at 95° C. for 30 seconds, annealing at 60° C. for 30 seconds, and polymerization at 72° C. for 60 seconds, and then polymerization at 72° C. for 5 minutes.

Additionally, in order to obtain the tkt gene including the tkt promoter, a tkt gene fragment including the tkt promoter was obtained using the primers of SEQ ID NO: 7 and SEQ ID NO: 8 based on the *Corynebacterium glutamicum* ATCC13869 chromosomal DNA as a template through PCR. Solg™ Pfu-X DNA polymerase was used as the polymerase, and the PCR was performed under PCR amplification conditions of denaturation at 95° C. for 5 minutes, followed by 30 cycles of denaturation at 95° C. for 30 seconds, annealing at 60° C. for 30 seconds, and polymerization at 72° C. for 150 seconds, and then polymerization at 72° C. for 5 minutes.

The amplified upstream and downstream regions of the aroP promoter, the tkt gene fragment including the tkt promoter, and the vector pDZ (Korean Patent No. 10-0924065) for chromosomal transformation cleaved by SmaI restriction enzyme were cloned using the Gibson assembly method (DG Gibson et al., *NATURE METHODS*, Vol. 6 No. 5, May 2009, NEBuilder HiFi DNA Assembly Master Mix) to obtain a recombinant plasmid, which was named pDZ-ΔaroP::Pn-tkt. The cloning was performed by mixing the Gibson assembly reagent and each of the gene fragments in a calculated number of moles followed by incubating at 50° C. for 1 hour.

Primer sequences used to construct each of the vectors are shown in Table 1 below.

TABLE 1

| SEQ ID NO: | Sequence (5'-3') |
|---|---|
| 3 | TCGAGCTCGGTACCCTGGGAACTTGTCGACGCTAT |
| 4 | TGTTCGGCAAGCATTGTGGTGTGGGCAATGATCAC |
| 5 | ATTAACGGTTAAAGTACTCATTGTGAGGTGGCGGG |
| 6 | CTCTAGAGGATCCCCGGAGCTGCTGTCCAACGTGG |
| 7 | CCACACCACAATGCTTGCCGAACATTTTTCTTTTC |
| 8 | CACAATGAGTACTTTAACCGTTAATGGAGTCCTTG |

The constructed pDZ-ΔaroP::Pn-tkt vector was transformed into the *Corynebacterium glutamicum* ATCC 13869 strain by electroporation and then subjected to secondary crossover to obtain a strain into which the tkt gene including the tkt promoter was inserted, while deleting the aroP gene at the same time. The corresponding genetic manipulation was confirmed through genome sequencing and a PCR method using the primers of SEQ ID NO: 9 and SEQ ID NO: 10, which can respectively amplify the external region of the upstream region and downstream region of the homologous recombination where the corresponding gene was inserted, and the resulting strain was named CM06-0001.

TABLE 2

| SEQ ID NO: | Sequence (5'-3') |
|---|---|
| 9 | ACGCGCCAAGTCGGACG |
| 10 | CGCACGATGTTTACCTGCG |

In order to strengthen the L-tyrosine pathway, a tyrA gene that receives a feedback regulation by L-tyrosine possessed by *Corynebacterium glutamicum* was replaced with a variant tyrA that does not receive the feedback regulation derived from *E. coli* including a strong gapA promoter. It is known that in the *E. coli*-derived tyrA protein, the feedback is released when methionine at position 53 is mutated to isoleucine, and alanine at position 354 is mutated to valine, and this form of protein (SEQ ID NO: 11) was used (*Appl. Microbiol. Biotechnol.* 75, 103-110 (2007)).

For the genetic manipulation, upstream and downstream regions of the tyrA gene in which the tyrA gene was to be inserted by substitution were first obtained. Specifically, a gene fragment in the upstream region of the tyrA gene was obtained using the primers of SEQ ID NO: 12 and SEQ ID NO: 13, and a gene fragment in the downstream region of the tyrA gene was obtained using the primers of SEQ ID NO: 14 and SEQ ID NO: 15 based on the *Corynebacterium glutamicum* ATCC13869 chromosomal DNA as a template through PCR. Solg™ Pfu-X DNA polymerase was used as the polymerase, and the PCR was performed under PCR amplification conditions of denaturation at 95° C. for 5 minutes, followed by 30 cycles of denaturation at 95° C. for 30 seconds, annealing at 60° C. for 30 seconds, and polymerization at 72° C. for 60 seconds, and then polymerization at 72° C. for 5 minutes.

Additionally, in order to obtain an *E. coli*-derived variant tyrA gene including a gapA promoter, a gapA promoter fragment was obtained using the primers of SEQ ID NO: 16 and SEQ ID NO: 17 based on the *Corynebacterium glutamicum* ATCC13869 chromosomal DNA as a template through PCR, and an *E. coli*-derived variant tyrA gene fragment was obtained using the primers of SEQ ID NO: 18 and SEQ ID NO: 19 based on the *E. coli*-derived variant tyrA synthetic DNA as a template through PCR.

Solg™ Pfu-X DNA polymerase was used as the polymerase, and the PCR was performed under PCR amplification conditions of denaturation at 95° C. for 5 minutes, followed by 30 cycles of denaturation at 95° C. for 30 seconds, annealing at 60° C. for 30 seconds, and polymerization at 72° C. for 60 seconds, and then polymerization at 72° C. for 5 minutes.

The amplified upstream and downstream regions of the tyrA gene, the *E. coli*-derived variant tyrA gene fragment including the gapA promoter, and the vector pDZ for chromosomal transformation cleaved by SmaI restriction enzyme were cloned using the Gibson assembly method to obtain a recombinant plasmid, which was named pDZ-ΔtyrA::PgapA-tyrAm. The cloning was performed by mixing the Gibson assembly reagent and each of the gene fragments in a calculated number of moles, followed by incubating at 50° C. for 1 hour.

Primer sequences used to construct each of the vectors are shown in Table 3 below.

TABLE 3

| SEQ ID NO: | Sequence (5'-3') |
|---|---|
| 12 | TTCGAGCTCGGTACCCTATCAAAACCGAGTTCTTCC |
| 13 | GTCGTTTTTAGGCCTCCTGACAAGTGTGGCACATAC |
| 14 | TGACAATCGCCAGTAATTTTATCGGCTGATGATTCT |
| 15 | ACTCTAGAGGATCCCCAACGCGATTGCATTCGGCTC |
| 16 | GTGCCACACTTGTCAGGAGGCCTAAAAACGACCGAG |
| 17 | TCAATTCAGCAACCATGTTGTGTCTCCTCTAAAGAT |
| 18 | TTAGAGGAGACACAACATGGTTGCTGAATTGACCGC |
| 19 | TCATCAGCCGATAAAATTACTGGCGATTGTCATTCG |

The constructed pDZ-ΔtyrA::PgapA-tyrAm vector was transformed into the CM06-0001 strain by electroporation and then subjected to secondary crossover to obtain a strain in which the *E. coli*-derived variant tyrA gene including the gapA promoter was inserted, while deleting the tyrA gene at the same time. The corresponding genetic manipulation was confirmed through genome sequencing and a PCR method using the primers of SEQ ID NO: 20 and SEQ ID NO: 21, which can respectively amplify the external region of the upstream region and downstream region of the homologous recombination where the corresponding gene was inserted, and the resulting strain was named CM06-0002.

TABLE 4

| SEQ ID NO: | Sequence (5'-3') |
|---|---|
| 20 | GCCCACTAGTCGAATCCC |
| 21 | CTGTCCGCAACCTGTGCG |

In order to increase L-tyrosine production, the aroG gene involved in the first step of the common aromatic biosynthetic pathway was enhanced by adding a strong promoter to an *E. coli*-derived feedback regulation release variant aroG. It is known that in the *E. coli*-derived aroG protein, the feedback is released when proline at position 150 is substituted with leucine, and this form of protein (SEQ ID NO: 68) was used (*Appl. Environ. Microbiol.* 63, 761-762 (1997)).

For the genetic manipulation, downstream and upstream regions into which the aroG gene was to be further inserted were obtained. Specifically, a gene fragment in the upstream region of BBD29_14470 gene was obtained using the primers of SEQ ID NO: 23 and SEQ ID NO: 24, and a gene fragment in the downstream region of BBD29_14470 gene was obtained using the primers of SEQ ID NO: 25 and SEQ ID NO: 26 based on the *Corynebacterium glutamicum* ATCC13869 chromosomal DNA as a template through PCR. Solg™ Pfu-X DNA polymerase was used as the polymerase, and the PCR was performed under PCR amplification conditions of denaturation at 95° C. for 5 minutes, followed by 30 cycles of denaturation at 95° C. for 30 seconds, annealing at 60° C. for 30 seconds, and polymerization at 72° C. for 60 seconds, and then polymerization at 72° C. for 5 minutes.

The amplified upstream and downstream regions in which the variant aroG was to be further inserted, and the vector pDZ for chromosomal transformation cleaved by SmaI restriction enzyme were cloned using the Gibson assembly method to obtain a recombinant plasmid, which was named pDZ-ΔBBD29_14470. The cloning was performed by mixing the Gibson assembly reagent and each of the gene fragments in a calculated number of moles, followed by incubating at 50° C. for 1 hour.

Additionally, in order to obtain an *E. coli*-derived variant aroG gene including a gapA promoter, a gapA promoter fragment was obtained using the primers of SEQ ID NO: 27 and SEQ ID NO: 28 based on the *Corynebacterium glutamicum* ATCC13869 chromosomal DNA as a template through PCR, and an *E. coli*-derived variant aroG gene fragment was obtained using the primers of SEQ ID NO: 29 and SEQ ID NO: 30 based on the *E. coli*-derived feedback release variant aroG synthetic DNA as a template through PCR. Solg™ Pfu-X DNA polymerase was used as the polymerase, and the PCR was performed under PCR amplification conditions of denaturation at 95° C. for 5 minutes, followed by 30 cycles of denaturation at 95° C. for 30 seconds, annealing at 60° C. for 30 seconds, and polymerization at 72° C. for 60 seconds, and then polymerization at 72° C. for 5 minutes.

The amplified variant aroG gene fragment including the gapA promoter, and the vector pDZ-ΔBBD29_14470 for chromosomal transformation cleaved by ScaI restriction enzyme were cloned using the Gibson assembly method to obtain a recombinant plasmid, which was named pDZ-ΔBBD29_14470::PgapA-aroGm. The cloning was performed by mixing the Gibson assembly reagent and each of the gene fragments in a calculated number of moles, followed by incubating at 50° C. for 1 hour.

Primer sequences used to construct each of the vectors are shown in Table 5 below.

TABLE 5

| SEQ ID NO: | Sequence (5'-3') |
|---|---|
| 23 | TCGAGCTCGGTACCCCCCGGCGGTATCGAGGTAGT |
| 24 | GACAAGTTTAGTACTTTAATCACCCGCGGGGACCC |
| 25 | GGTGATTAAAGTACTAAACTTGTCCCGAGGGTGAG |
| 26 | CTCTAGAGGATCCCCTATCAGTCACTTCCCTGAGA |
| 27 | GCGGGTGATTAAAGTGAGGCCTAAAAACGACCGAG |
| 28 | GTTCTGATAATTCATGTTGTGTCTCCTCTAAAGAT |
| 29 | ATGAATTATCAGAACGACGA |
| 30 | CGGGACAAGTTTAGTTTACCCGCGACGCGCTTTTA |

The constructed pDZ-ΔBBD29_14470::PgapA-aroGm vector was transformed into the CM06-0002 strain by electroporation and then subjected to secondary crossover to obtain a strain into which the *E. coli*-derived feedback release variant aroG gene including the gapA promoter was inserted. The corresponding genetic manipulation was confirmed through genome sequencing and a PCR method using the primers of SEQ ID NO: 31 and SEQ ID NO: 32, which can respectively amplify the external region of the upstream region and downstream region of the homologous recombination where the corresponding gene was inserted, and the resulting strain was named CM06-0003.

TABLE 6

| SEQ ID NO: | Sequence (5'-3') |
| --- | --- |
| 31 | TTGATATGACCGCAGCCTGA |
| 32 | CTGCATTCTCATCGATCTTG |

When the common aromatic production pathway is strengthened, it can be predicted that the production of L-tyrosine and L-tryptophan is increased the most when the production of L-phenylalanine is minimized in a competitive pathway in the increased chorismate pool. However, if the pheA gene in the competitive pathway is deleted, the production of L-phenylalanine becomes impossible, and L-phenylalanine is needed, and thus, the L-tryptophan regulation mechanism was used so as not to affect the growth of the cells while maintaining the low concentration.

It can be predicted that L-tryptophan concentration is precisely regulated such that the growth of cells is not interfered with while L-tryptophan is maintained at a low concentration at all times during culture. It is also known in the literature that the L-tryptophan production is simultaneously regulated by attenuators and promoters according to L-tryptophan concentration (*Appl. Environ Microbiol* 59 791, 1993).

Therefore, pheA, an L-phenylalanine production gene, was subjected to a regulatory mechanism of L-tryptophan, so that the pheA gene could be regulated according to the L-tryptophan concentration.

In order to allow the pheA gene to be regulated by the promoter of trpE gene, an upstream region into which the gene was to be inserted, a trpE promoter region, and a downstream region into which the gene was to be inserted were obtained. Specifically, a gene fragment in the upstream region into which the gene was to be inserted was obtained using the primers of SEQ ID NO: 33 and SEQ ID NO: 34; a gene fragment in the trpE promoter region was obtained using the primers of SEQ ID NO: 35 and SEQ ID NO: 36; and a gene fragment in the downstream region into which the gene was to be inserted was obtained using the primers of SEQ ID NO: 37 and SEQ ID NO: 38 based on the *Corynebacterium glutamicum* ATCC13869 chromosomal DNA as a template through PCR. Solg™ Pfu-X DNA polymerase was used as the polymerase, and PCR was performed under PCR amplification conditions of denaturation at 95° C. for 5 minutes, followed by 30 cycles of denaturation at 95° C. for 30 seconds, annealing at 60° C. for 30 seconds, and polymerization at 72° C. for 30 seconds, and then polymerization at 72° C. for 5 minutes.

The amplified upstream and downstream regions into which the gene was to be inserted, the trpE promoter region, and the vector pDZ for chromosomal transformation cleaved by SmaI restriction enzyme were cloned using the Gibson assembly method to obtain a recombinant plasmid, which was named pDZ-ΔPpheA::PtrpE. The cloning was performed by mixing the Gibson assembly reagent and each of the gene fragments in a calculated number of moles, followed by incubating at 50° C. for 1 hour.

The constructed pDZ-ΔPpheA::PtrpE vector was transformed into the CM06-0003 strain by electroporation and then subjected to secondary crossover to obtain a strain in which the pheA gene was allowed to be regulated by the trpE promoter. The corresponding genetic manipulation was confirmed through genome sequencing and a PCR method using the primers of SEQ ID NO: 39 and SEQ ID NO: 40, which can respectively amplify the external region of the upstream region and downstream region of the homologous recombination where the corresponding gene was inserted, and the resulting strain into which the trpE promoter was inserted upstream of the pheA was named CM06-0005.

Primer sequences used to construct each of the vectors are shown in Table 7 below.

TABLE 7

| SEQ ID NO: | Sequence (5'-3') |
| --- | --- |
| 33 | TTCGAGCTCGGTACCCGGAGGGGTTTCCACCTCG |
| 34 | TGGGAAGCTTGTCTCAATTATGTCTGTTGCTCAATTAGCG |
| 35 | CTAATTGAGCAACAGACATAATTGAGACAAGCTTCCCA |
| 36 | AATTGGTGCGTCGCTCATGGGGCACCTACCGAGGAA |
| 37 | TTCCTCGGTAGGTGCCCCATGAGCGACGCACCAATTGTTG |
| 38 | CGACTCTAGAGGATCCCCCCGAAGAGTTCGGCTGCG |
| 39 | CCAGCGATGATCGCGCCG |
| 40 | ATCGCCGTGGAGCCAGCC |

Since the L-tyrosine production starts with PEP and E4P as precursors, the use of non-phosphotransferase system (PTS) can allow an enhanced supply of PEP, and thus a high production of L-tyrosine can be expected (*Nature biotechnol* 14 620, 1996). Therefore, ptsG, a PTS gene of the strain, was removed, and *Zymomonas mobilis* ATCC 10988-derived glf, a non-PTS gene, was introduced.

In order to delete ptsG and insert glf, upstream and downstream regions into which the *Zymomonas mobilis*-derived glf was to be inserted were obtained. Specifically, a gene fragment in the upstream region of the ptsG gene was obtained using the primers of SEQ ID NO: 41 and SEQ ID NO: 42, and a gene fragment in the downstream region of the ptsG gene was obtained using the primers of SEQ ID NO: 43 and SEQ ID NO: 44 based on the *Corynebacterium glutamicum* ATCC13869 chromosomal DNA as a template through PCR. Solg™ Pfu-X DNA polymerase was used as the polymerase, and PCR was performed under PCR amplification conditions of denaturation at 95° C. for 5 minutes, followed by 30 cycles of denaturation at 95° C. for 30 seconds, annealing at 60° C. for 30 seconds, and polymerization at 72° C. for 60 seconds, and then polymerization at 72° C. for 5 minutes.

Additionally, in order to obtain the glf gene including a well-known cj7 promoter (SEQ ID NO: 45, Korean Patent No. 10-0620092), a cj7 promoter fragment was obtained using the primers of SEQ ID NO: 46 and SEQ ID NO: 47 based on the synthetic cj7 promoter DNA as a template through PCR, and a glf gene fragment was obtained using the primers of SEQ ID NO: 48 and SEQ ID NO: 49 based on the *Zymomonas mobilis* ATCC10988 chromosomal DNA as a template through PCR. Solg™ Pfu-X DNA polymerase was used as the polymerase, and PCR was performed under PCR amplification conditions of denaturation at 95° C. for 5 minutes, followed by 30 cycles of denaturation at 95° C. for 30 seconds, annealing at 60° C. for 30 seconds, and polymerization at 72° C. for 60 seconds, and then polymerization at 72° C. for 5 minutes.

The amplified upstream and downstream regions of the ptsG gene, the glf gene fragment including the cj7 promoter, and the vector pDZ for chromosomal transformation cleaved by ScaI restriction enzyme were cloned using the Gibson assembly method to obtain a recombinant plasmid, which was named pDZ-ΔptsG::pcj7-glf. The cloning was performed by mixing the Gibson assembly reagent and each of the gene fragments in a calculated number of moles, followed by incubating at 50° C. for 1 hour.

Primer sequences used in the Reference Example are shown in Table 8 below.

TABLE 8

| SEQ ID NO: | Sequence (5'-3') |
|---|---|
| 41 | TTCGAGCTCGGTACCCGAGGGCTCACTGACGTTGA |
| 42 | CGCTGGGATGTTTCTACCGGATTCGATTCCTCAG |
| 43 | CGCTCCCAGAAGTAGGCTCAAACCTTGCCCATAAC |
| 44 | CTCTAGAGGATCCCCCTCCCCCAAACCACGCTTTT |
| 46 | GGAATCGAATCCGGTAGAAACATCCCAGCGCTACT |
| 47 | TACTTTCAGAACTCATGAGTGTTTCCTTTCGTTGG |
| 48 | ACGAAAGGAAACACTCATGAGTTCTGAAAGTAGTC |
| 49 | GGGCAAGGTTTGAGCCTACTTCTGGGAGCGCCACA |

The constructed pDZ-ΔptsG::pcj7-glf vector was transformed into the CM06-0005 strain by electroporation and then subjected to secondary crossover to obtain a strain into which the *Zymomonas mobilis*-derived glf gene including the cj7 promoter was inserted. The corresponding genetic manipulation was confirmed through genome sequencing and a PCR method using the primers of SEQ ID NO: 50 and SEQ ID NO: 51, which can respectively amplify the external region of the upstream region and downstream region of the homologous recombination where the corresponding gene was inserted, and the resulting strain was named CM06-0010.

TABLE 9

| SEQ ID NO: | Sequence (5'-3') |
|---|---|
| 50 | ACATTAAGTGGTAGGCGCTGA |
| 51 | CATAACAGGGCAGAACAAAC |

Reference Example 2: Evaluation of Production Ability of L-Tyrosine-Producing Strains In order to confirm the L-tyrosine producing ability of the strains constructed in Example 1, the strains were cultured and evaluated in the following manner. Each of the strains was inoculated into a 250 mL corner-baffled flask containing 25 mL of the following seed medium and was cultured with shaking at 200 rpm at 30° C. for 20 hours. Next, 1 mL of the seed culture solution was inoculated into a 250 mL corner-baffled flask containing 25 mL of the following production medium and was cultured with shaking at 200 rpm at 30° C. for 24 hours. After the culture, the production amount of L-tyrosine, L-phenylalanine, and L-tryptophan was measured by HPLC.

<Seed Medium (pH 7.0)>

20 g glucose, 10 g peptone, 5 g yeast extract, 1.5 g urea, 4 g $KH_2PO_4$, 8 g $K_2HPO_4$, 0.5 g $MgSO_4 \cdot 7H_2O$, 100 μg biotin, 1,000 μg thiamine HCl, 2,000 μg calcium-pantothenate, and 2,000 μg nicotinamide (per liter of distilled water)

<Production Medium (pH 7.0)>

30 g glucose, 15 g $(NH_4)_2SO_4$, 1.2 g $MgSO_4 \cdot 7H_2O$, 1 g $KH_2PO_4$, 5 g yeast extract, 900 μg biotin, 4,500 μg thiamine HCl, 4,500 μg calcium pantothenate, and 30 g $CaCO_3$ (per liter of distilled water).

TABLE 10

Evaluation of Production Ability of *Corynebacterium Glutamicum* ATCC 13869-Derived L-Tyrosine-Producing Strains

| Strain No. | Genotype | Glucose used (g/L) | Production amount of L-tyrosine (g/L) | Production amount of L-phenylalanine (g/L) | Production amount of L-tryptophan (g/L) |
|---|---|---|---|---|---|
| ATCC 13869 | Wild-type | 30 | 0.00 | 0.00 | 0.00 |
| CM06-0001 | ATCC 13869ΔaroP::Pn-tkt | 30 | 0.00 | 0.00 | 0.00 |
| CM06-0002 | CM06-0001ΔtyrA::PgapA-tyrAm | 30 | 0.00 | 0.00 | 0.00 |
| CM06-0003 | CM06-0002Δ BBD29_14470::PgapA-aroGm | 30 | 0.38 | 1.11 | 0.02 |
| CM06-0005 | CM06-0003 ΔPpheA::PtrpE | 30 | 1.61 | 0.03 | 0.02 |
| CM06-0010 | CM06-0005 ΔptsG::pcj7-glf | 30 | 2.12 | 0.03 | 0.02 |

The results of L-tyrosine, L-phenylalanine, and L-tryptophan production in the cultures of the wild-type *Corynebacterium glutamicum* ATCC 13869, CM06-0001, CM06-0002, CM06-0003, CM06-0005, and CM06-0010 are as shown in Table 10.

L-Tyrosine was not produced in CM06-0001, which is a strain that enhances the supply of E4P, a precursor, prepared by deleting the aromatic amino acid importer gene from the wild-type strain, and L-tyrosine was also not detected in CM06-0002, in which the tyrA feedback inhibition was further released in CM06-0001.

The L-tyrosine and L-phenylalanine production was confirmed in the CM06-0003 strain, in which the common aromatic compounds production pathway enhanced by releasing the feedback inhibition of aroG in the CM06-0002 strain. The L-tyrosine and L-phenylalanine production increased significantly compared to the previous strains, but the L-tryptophan production showed no dramatic change. Additionally, in the case of the CM06-0005 strain, in which the L-phenylalanine pathway was regulated by the L-tryptophan concentration, L-tyrosine was produced in a yield of 5.37%. The L-tyrosine production of CM06-0005 was improved by 283% compared to the parent strain CM06-0003. From the above results, it can be confirmed that when pheA was regulated by the L-tryptophan concentration, L-tyrosine production was significantly increased.

Further, as expected, it was confirmed that the production of L-tyrosine was increased in CM06-0010, a non-PTS strain that can facilitate PEP supply, compared to CM06-0005, a PTS strain. CM06-0010 strain produced L-tyrosine with an improved yield of 7.06%.

Example 1: Construction of Strain into which L-Tryptophan-Exporting Protein of L-Tyrosine-Producing Strain The tyrosine exporting ability was confirmed by introducing the novel L-tryptophan-exporting protein (WO 2019164348 A1) into the L-tyrosine-producing strain CM06-0010 prepared in Reference Example 1.

The novel L-tryptophan-exporting protein is a membrane protein derived from *Herbaspirillum rhizosphaerae* and has the amino acid sequence represented by SEQ ID NO: 52. The vector for transformation used in International Patent No. WO 2019164348 A1 was pDZTn-PgapA-Hrh, and the same vector was transformed into the L-tyrosine-producing strain CM06-0010 by electroporation (*Appl. Microbiol. Biotechnol.* (1999) 52:541-545) and then subjected to secondary crossover to obtain a strain into which one copy of PgapA-Hrh was inserted between the transposon gene on the chromosome. The PgapA-Hrh gene-expressed protein was named Wex, and the corresponding genetic manipulation was confirmed through genome sequencing and a PCR method using the primers of SEQ ID NO: 53 and SEQ ID NO: 54, which can respectively amplify the external region of the upstream region and downstream region of the homologous recombination where the corresponding gene was inserted.

TABLE 11

| SEQ ID NO: | Sequence (5'-3') |
|---|---|
| 53 | CGGATTATGCCAATGATGTG |
| 54 | CACGATCACCAACATTCAGG |

The thus-obtained strain was named *Corynebacterium glutamicum* CM06-0111.

Example 2: Evaluation of Production Ability of L-Tyrosine-Producing Strain Introduced with L-Tryptophan-Exporting Protein Wex In order to confirm the L-tyrosine producing ability of the strain prepared in Example 1, the strain was cultured using the method and medium composition described in Reference Example 2.

TABLE 12

Evaluation of Production Ability in Production Medium of Strains introduced with PgapA-Hrh

| Strain No. | Genotype | Glucose used (g/L) | Production amount of L-tyrosine (g/L) | Yield of L-tyrosine (%) | Production amount of L-phenylalanine (g/L) | Production amount of L-tryptophan (g/L) |
|---|---|---|---|---|---|---|
| CM06-0010 | CM06-0005 ΔptsG::pcj7-glf | 30 | 2.2 | 7.3 | 0.05 | 0.02 |
| CM06-0111 | CM06-0010-PgapA_Hrh | 30 | 2.1 | 7.1 | 0.06 | 0.02 |

The results for the production of L-tyrosine, L-phenylalanine, and L-tryptophan in the cultures of the L-tyrosine-producing strains CM06-0010 and CM06-0111 are shown in Table 12 above.

The strain introduced with Wex membrane protein, which is an L-tryptophan exporter, did not show an L-tyrosine exporting ability, and it was not possible to confirm whether there was an increase due to a small amount of L-tryptophan. Accordingly, it was attempted to impart substrate specificity for L-tyrosine by introducing a mutation into the Wex membrane protein.

Example 3: Substitution of Leucine, Amino Acid 79, with Other Amino Acids in Wex Sequence of L-Tyrosine-Producing Strain In order to provide substrate specificity for L-tyrosine of the Wex membrane protein, leucine, which is the $79^{th}$ amino acid (hereinafter referred to as $79^{th}$ leucine or $79^{th}$), was substituted with other amino acids to find mutants that export L-tyrosine. In order to provide mutations of amino acids other than leucine, site-directed mutagenesis was performed using the pDZTn-PgapA-Hrh used in Example 1 as a template. Site-directed mutagenesis was performed in the following way.

TABLE 13

Site-Direction Mutagenesis PCR Compositions

| | Unit (μL) |
|---|---|
| 10X pfu-X Buffer | 5 |
| 10 mM dNTP Mix | 1 |
| pfu-X Polymerase | 1 |
| Mutagenic forward primer (5 pmol) | 2 |
| Mutagenic reverse primer (5 pmol) | 2 |
| pDZTn-PgapA-Hrh (template DNA, 200 ng/μL) | 1 |
| $dH_2O$ | 38 |
| Total | 50 |

TABLE 14

| Site-Direction Mutagenesis PCR cycle | | |
|---|---|---|
| Cycle | Temperature | Time |
| 1 | 95° C. | 1 min |
| 18 | 95° C. | 50 sec |
| | 60° C. | 50 sec |
| | 68° C. | 9 min |
| 1 | 68° C. | 7 min |

In order to substitute leucine, the 79$^{th}$ amino acid in the Wex amino acid sequence, with other amino acids, e.g., alanine (A) (SEQ ID NO: 1), glycine (G) (SEQ ID NO: 2), isoleucine (I) (SEQ ID NO: 77), methionine (M) (SEQ ID NO: 78), threonine (T) (SEQ ID NO: 79)), tyrosine (Y) (SEQ ID NO: 80), asparagine (N) (SEQ ID NO: 81), arginine (R) (SEQ ID NO: 82), tryptophan (W) (SEQ ID NO: 83), serine (S) (SEQ ID NO: 84)), and proline (P) (SEQ ID NO: 85), a PCR mixture as shown in Table 14 was made using each mutagenic primer set indicated in Table 15, and PCR was performed with the cycle shown in Table 15. After PCR was completed, 1 μL of DpnI restriction enzyme was added and then treated at 37° C. for 1 hour. Then, 3 μL of DpnI-treated DNA was transformed into DH5a competent cells to obtain pDZTn-PgapA-wex mutant plasmids, and each mutation was confirmed as shown in Table 15 through sequencing.

TABLE 15

Mutagenic primer sets for construction of 79$^{th}$ amino acid mutant plasmids of Wex amino acid sequence

| Mutant Wex Plasmid | SEQ ID NO: | Sequence (5'-3') |
|---|---|---|
| pDZTn-PgapA-wex L79A | 55 | GTGTCCTACGAACTCTGC**GCA**TCGCTCTCCATCGGTTATG |
| | 56 | CATAACCGATGGAGAGCGA**TGC**GCAGAGTTCGTAGGACAC |
| pDZTn-PgapA-wex L791 | 57 | GTGTCCTACGAACTCTGC**ATC**TCGCTCTCCATCGGTTATG |
| | 58 | CATAACCGATGGAGAGCGA**GAT**GCAGAGTTCGTAGGACAC |
| pDZTn-PgapA-wex L79G | 59 | GTGTCCTACGAACTCTGC**GGC**TCGCTCTCCATCGGTT |
| | 60 | CATAACCGATGGAGAGCGA**GCC**GCAGAGTTCGTAGG |
| pDZTn-PgapA-wex L79M | 61 | GTGTCCTACGAACTCTGC**ATG**TCGCTCTCCATCGGTT |
| | 62 | CATAACCGATGGAGAGCGA**CAT**GCAGAGTTCGTAGG |
| pDZTn-PgapA-wex L79T | 63 | GTGTCCTACGAACTCTGC**ACC**TCGCTCTCCATCGGTT |
| | 64 | CATAACCGATGGAGAGCGA**GGT**GCAGAGTTCGTAGG |
| pDZTn-PgapA-wex L79Y | 65 | GTGTCCTACGAACTCTGC**TAC**TCGCTCTCCATCGGTT |
| | 66 | CATAACCGATGGAGAGCGA**GTA**GCAGAGTTCGTAGG |
| pDZTn-PgapA-wex L79N | 67 | GTGTCCTACGAACTCTGC**AAC**TCGCTCTCCATCGGTT |
| | 68 | CATAACCGATGGAGAGCGA**GTT**GCAGAGTTCGTAGG |
| pDZTn-PgapA-wex L79W | 69 | GTGTCCTACGAACTCTGC**TGG**TCGCTCTCCATCGGTT |
| | 70 | CATAACCGATGGAGAGCGA**CCA**GCAGAGTTCGTAGG |
| pDZTn-PgapA-wex L79R | 71 | GTGTCCTACGAACTCTGC**CGC**TCGCTCTCCATCGGTT |
| | 72 | CATAACCGATGGAGAGCGA**GCG**GCAGAGTTCGTAGG |
| pDZTn-PgapA-wex L79S | 73 | GTGTCCTACGAACTCTGC**TCC**TCGCTCTCCATCGGTT |
| | 74 | CATAACCGATGGAGAGCGA**GGA**GCAGAGTTCGTAGG |
| pDZTn-PgapA-wex L79P | 75 | GTGTCCTACGAACTCTGC**CCA**TCGCTCTCCATCGGTT |
| | 76 | CATAACCGATGGAGAGCGA**TGG**GCAGAGTTCGTAGG |

The pDZTn-PgapA-wex L79A, pDZTn-PgapA-wex L79I, pDZTn-PgapA-wex L79G, pDZTn-PgapA-wex L79M, pDZTn-PgapA-wex L79S, pDZTn-PgapA-wex L79P, pDZTn-PgapA-wex L79T, pDZTn-PgapA-wex L79Y, pDZTn-PgapA-wex L79N, pDZTn-PgapA-wex L79W, and pDZTn-PgapA-wex L79R vectors prepared as shown in Table 15 were each transformed into CM06-0111 prepared in Example 2 by electroporation and then subjected to secondary crossover to obtain 19 strains into which the mutant wex gene was inserted on the chromosome. The corresponding genetic manipulation was confirmed through genome sequencing and a PCR method using the primers of SEQ ID NO: 53 and SEQ ID NO: 54, which can respectively amplify the external region of the upstream region and downstream region of the homologous recombination where the corresponding gene was inserted.

The thus-obtained transformed strains were named CM06-0112 (wex L79A), CM06-0114 (wex L79I), CM06-0115 (wex L79G), CM06-0117 (wex L79M), CM06-0118 (wex L79S), CM06-0119 (wex L79P), CM06-0120 (wex L79T), CM06-0121 (wex L79Y), CM06-0124 (wex L79N), CM06-0128 (wex L79W), and CM06-0129 (wex L79R).

In order to confirm the production amount of tyrosine in the strains of CM06-0112 (wex L79A), CM06-0114 (wex L79I), CM06-0115 (wex L79G), CM06-0117 (wex L79M), CM06-0118 (wex L79S), CM06-0119 (wex L79P), CM06-0120 (wex L79T), CM06-0121 (wex L79Y), CM06-0124 (wex L79N), CM06-0128 (wex L79W), and CM06-0129 (wex L79R), the strains were cultured in the same manner as in Example 2. After the completion of the culture, the production amount of L-tyrosine was measured by HPLC.

TABLE 16

Evaluation of production ability of L-tyrosine-producing strains in which the 79th amino acid of the Wex amino acid sequence was replaced with mutants

| Strain No. | Genotype | Glucose used (g/L) | Production amount of L-tyrosine (g/L) | Yield of L-tyrosine (%) |
|---|---|---|---|---|
| CM06-0010 | CM06-0005 ΔptsG::pcj7-glf | 30 | 2.18 | 7.27 |
| CM06-0111 | CM06-0010-PgapA_Hrh (Wex) | 30 | 2.16 | 7.20 |
| CM06-0112 | CM06-0010-PgapA_wex L79A | 30 | 2.92 | 9.73 |
| CM06-0114 | CM06-0010-PgapA_wex L79I | 30 | 2.23 | 7.43 |
| CM06-0115 | CM06-0010-PgapA_wex L79G | 30 | 2.88 | 9.60 |
| CM06-0117 | CM06-0010-PgapA_wex L79M | 30 | 2.32 | 7.73 |
| CM06-0118 | CM06-0010-PgapA_wex L79S | 30 | 2.17 | 7.23 |
| CM06-0119 | CM06-0010-PgapA_wex L79P | 30 | 2.17 | 7.23 |
| CM06-0120 | CM06-0010-PgapA_wex L79T | 30 | 2.33 | 7.77 |
| CM06-0121 | CM06-0010-PgapA_wex L79Y | 30 | 2.24 | 7.47 |
| CM06-0124 | CM06-0010-PgapA_wex L79N | 30 | 2.29 | 7.63 |
| CM06-0128 | CM06-0010-PgapA_wex L79W | 30 | 2.19 | 7.30 |

The strain introduced with the wild-type Wex membrane protein had insignificant effects, whereas the CM06-0112 strain introduced with the Wex L79A mutation had an L-tyrosine concentration of 2.92 g/L in flask culture, in which the yield was improved by about 2.5% p relative to the control CM06-0111. In addition, it was confirmed that the yield of the CM06-0115 strain introduced with the Wex L79G mutation was also improved by 2.4% p, confirming that the Wex L79A mutation and the L79G mutation specifically excrete L-tyrosine.

The CM06-0112 strain was deposited at the Korean Culture Center of Microorganisms (KCCM), an International Depositary Authority, under the Budapest Treaty on Apr. 27, 2020 with Accession No. KCCM12708P.

From the foregoing, a skilled person in the art to which the present application pertains will be able to understand that the present application may be embodied in other specific forms without modifying the technical concepts or essential characteristics of the present application. In this regard, the exemplary embodiments disclosed herein are only for illustrative purposes and should not be construed as limiting the scope of the present application. On the contrary, the present application is intended to cover not only the exemplary embodiments but also various alternatives, modifications, equivalents, and other embodiments that may be included within the spirit and scope of the present application as defined by the appended claims.

The invention claimed is:

1. A microorganism for producing L-tyrosine, wherein the microorganism is modified to express a protein variant, wherein the protein variant comprises SEQ ID NO: 52, wherein the 79$^{th}$ amino acid from the N-terminus of SEQ ID NO: 52 is substituted with alanine or glycine.

2. The microorganism of claim 1, wherein the microorganism is of the genus *Corynebacterium*.

3. A method for producing L-tyrosine, comprising culturing the microorganism of claim 1 and producing L-tyrosine.

4. The method of claim 3, further comprising recovering the produced L-tyrosine.

5. The method of claim 3, wherein the microorganism is of the genus *Corynebacterium*.

6. A protein variant having an L-tyrosine exporting activity; wherein the protein variant comprises SEQ ID NO: 52, wherein the 79$^{th}$ amino acid from the N-terminus of SEQ ID NO: 52 is substituted with alanine or glycine.

7. A polynucleotide encoding the protein variant of claim 6.

8. A vector containing the polynucleotide of claim 7.

* * * * *